United States Patent
Yousko et al.

[11] Patent Number: 6,141,848
[45] Date of Patent: Nov. 7, 2000

[54] CONTOURED STRINGER/CLIP DRILLING

[75] Inventors: David A. Yousko; Hugh R. Schlosstein, both of Renton; David M. Kozy, Kent; Dennis M. Cordy, Auburn; Edward F. Neary, Renton; Hinrich C. Patjens, Tacoma, all of Wash.

[73] Assignee: The Boeing Company, Seattle, Wash.

[21] Appl. No.: 09/106,636

[22] Filed: Jun. 28, 1998

Related U.S. Application Data

[60] Provisional application No. 60/051,177, Jun. 28, 1997.

[51] Int. Cl.$^7$ .............................. B23P 21/00; B23B 41/00; B21J 15/14
[52] U.S. Cl. ........................... 29/33 K; 29/34 B; 227/111
[58] Field of Search .................................. 29/34 B, 33 K, 29/407, 525.2, 557, 564.7, 243.53, 243.54

[56] References Cited

U.S. PATENT DOCUMENTS

| | | | |
|---|---|---|---|
| 4,762,261 | 8/1988 | Hawly et al. | 227/111 |
| 4,885,836 | 12/1989 | Bonomi et al. | 29/34 B X |
| 4,966,323 | 10/1990 | Speller, Sr. et al. | 29/34 B X |
| 4,967,947 | 11/1990 | Sarh . | |
| 5,127,139 | 7/1992 | McCowin et al. . | |
| 5,249,785 | 10/1993 | Nelson et al. . | |
| 5,299,894 | 4/1994 | McCowin . | |
| 5,477,596 | 12/1995 | Schlosstein et al. . | |
| 5,560,102 | 10/1996 | Micale et al. . | |
| 5,896,637 | 4/1999 | Sarh | 29/33 K X |

*Primary Examiner*—William Briggs
*Attorney, Agent, or Firm*—J. Michael Neary

[57] ABSTRACT

An assembly cell for accurate placement of stringer clips in a channel of a stringer for a compound contour section of an airplane fuselage, and for holding the clips at a predetermined orientation while drilling holes for fastening the clips in the stringers includes a fixture having locating surfaces for holding the stringer in a configuration that is the same as the configuration it will have when installed at its designated position in the airplane. The fixture has headers adjustable to conform to the shape of the airplane in which the stringers will be installed, The headers have clamps for securing the stringers against accurately machined reference surfaces on the headers. An end effector is held by a machine tool in the assembly cell for gripping a stringer clip and inserting it into the stringer channel. The end effector has spreader bars for insertion in the stringer channel operable to spread sidewalls of the stringer and widen the channel to facilitate insertion of the stringer clip, and has clamp bars positionable on opposide sides of the stringer and operable to close on the stringer to squeeze the stringer sidewalls on the stringer clip after insertion in the channel. Opposed drills on the end effector have right angle drives holding drill bits for simultaneously match drilling holes through the sidewalls and through the stringer clip. The end effector machine tool operates as a positioning mechanism for accurately for positioning the drills at each stringer clip location along the stringer clip to positions corresponding to the contour of the fuselage at each of the locations under control of a CNC machine controller.

10 Claims, 26 Drawing Sheets

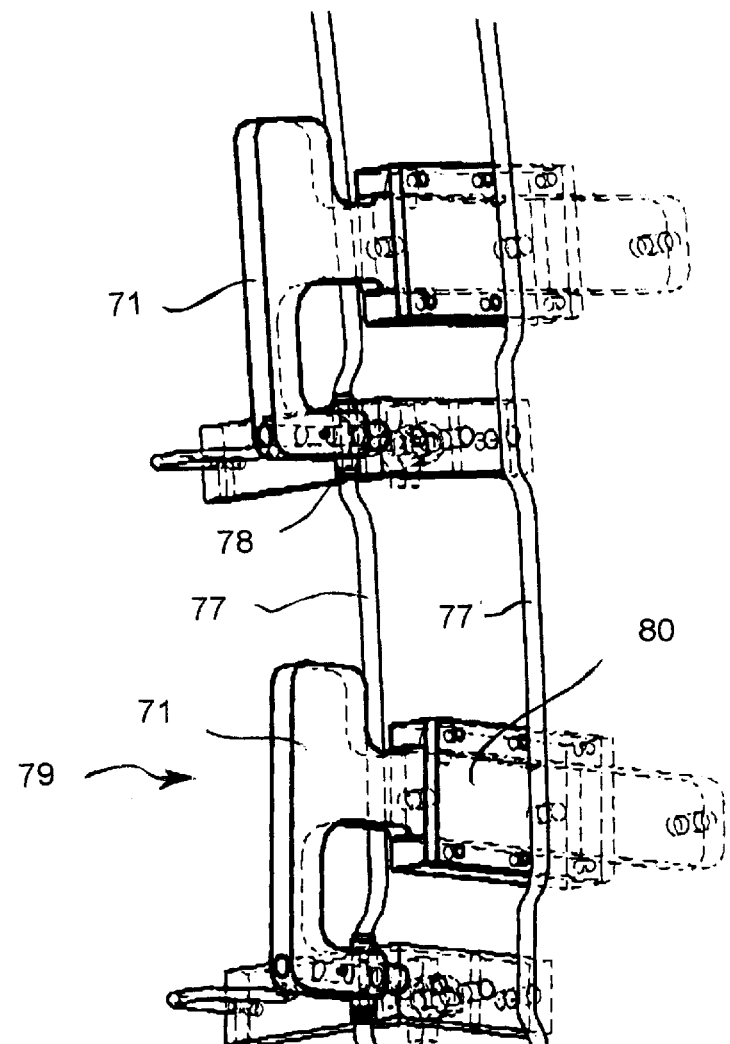
Fig. 5
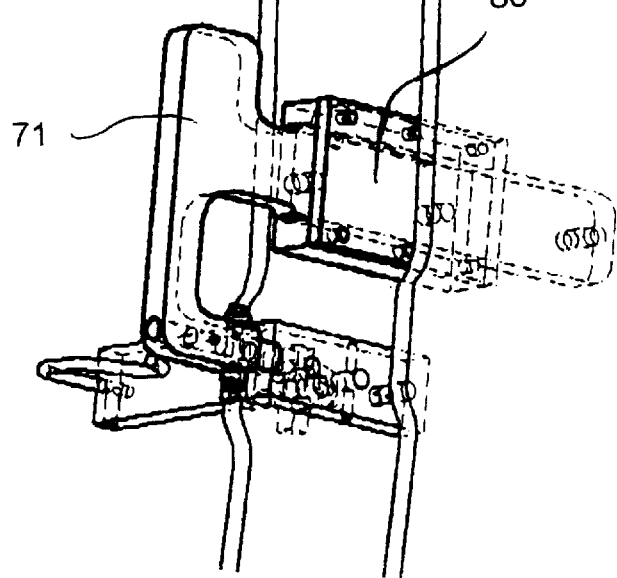

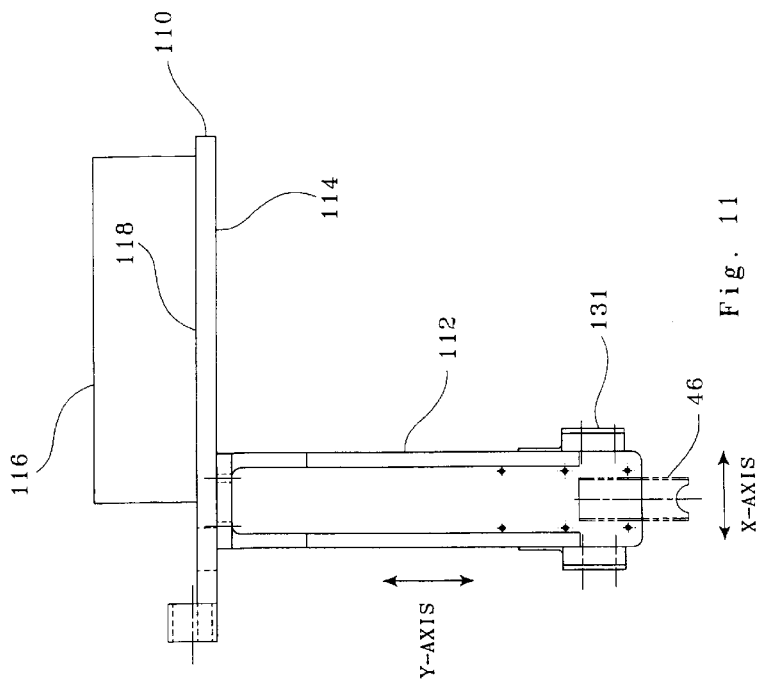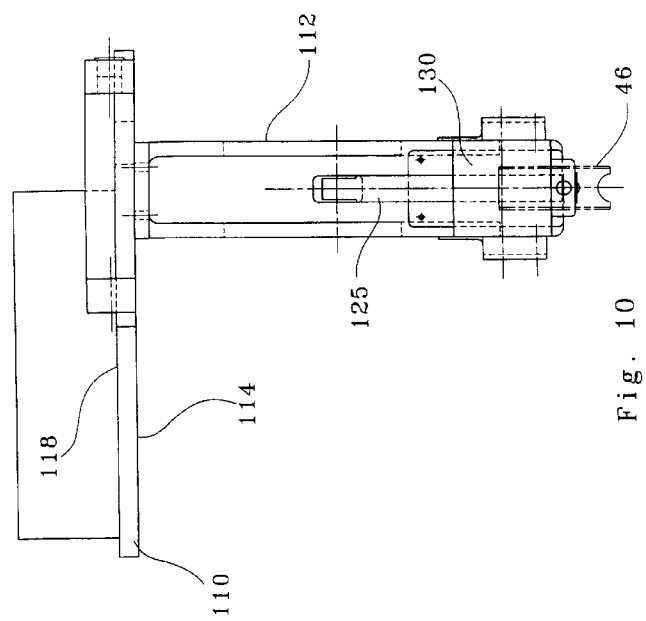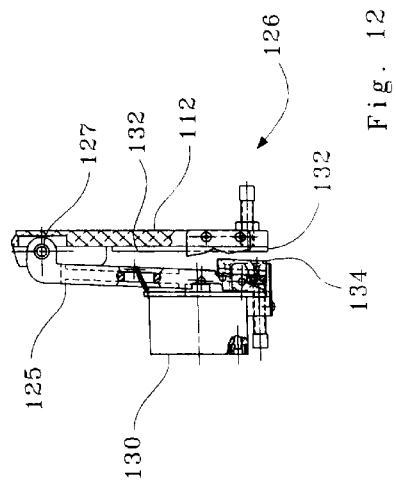

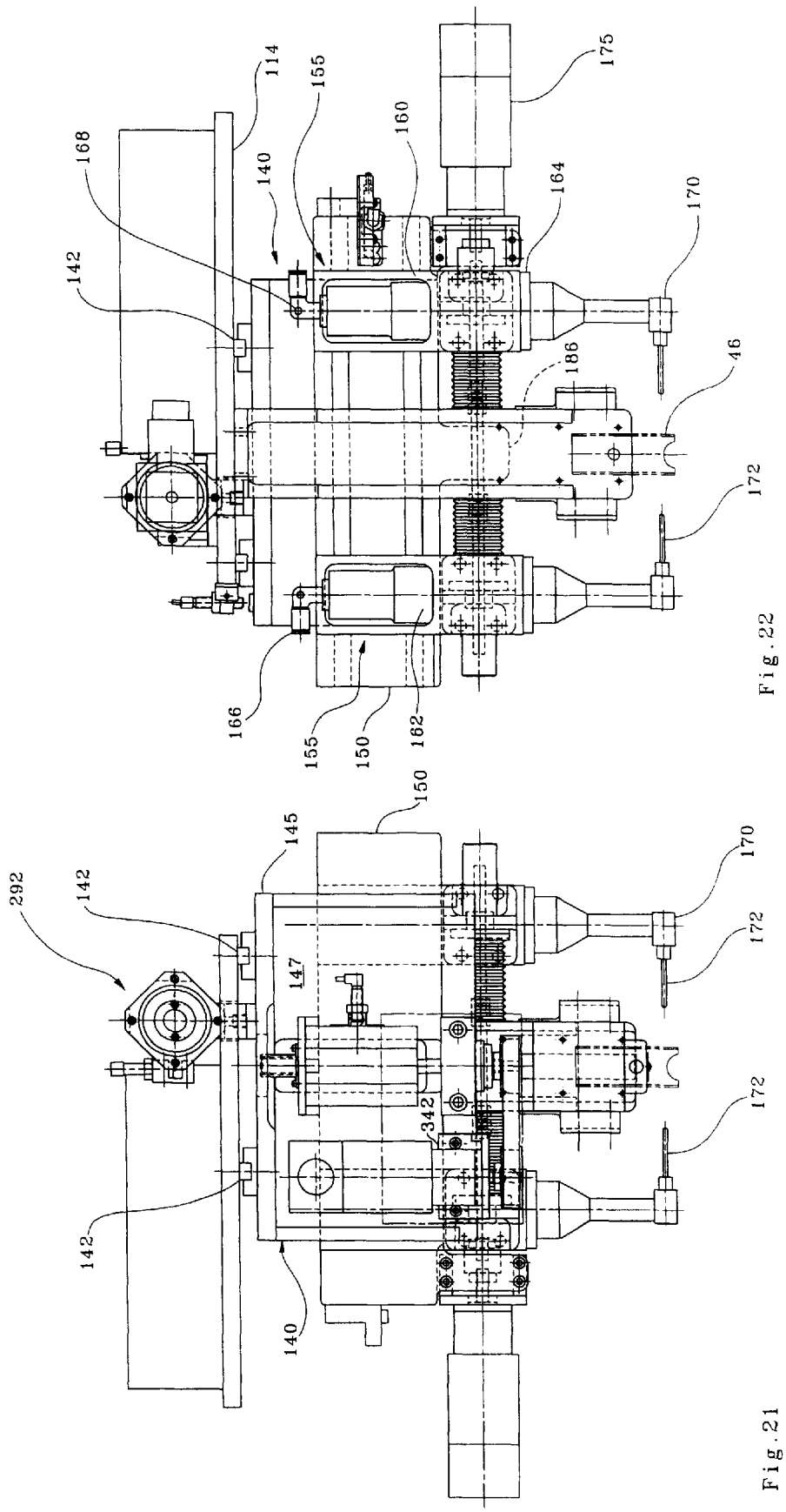

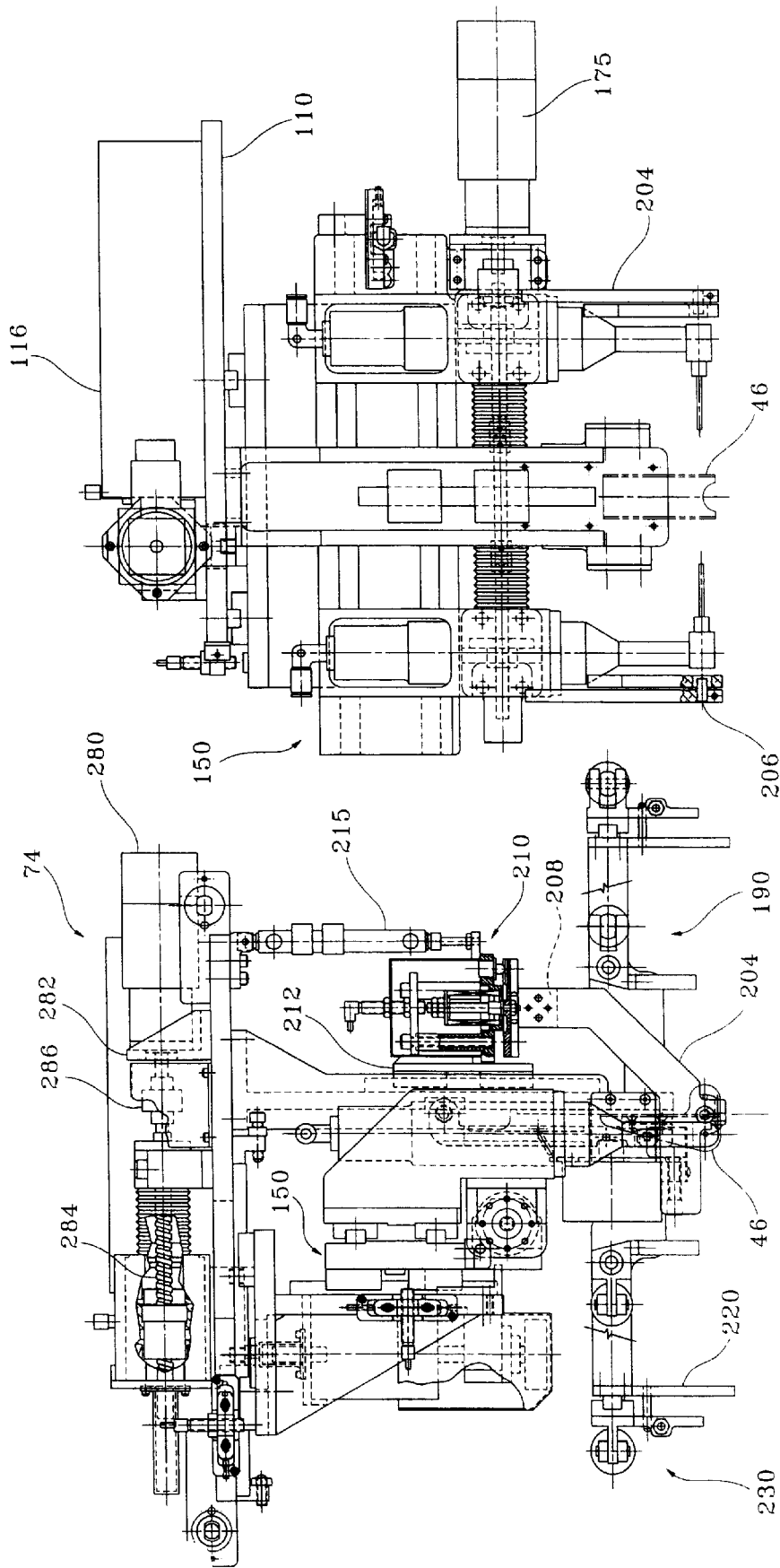

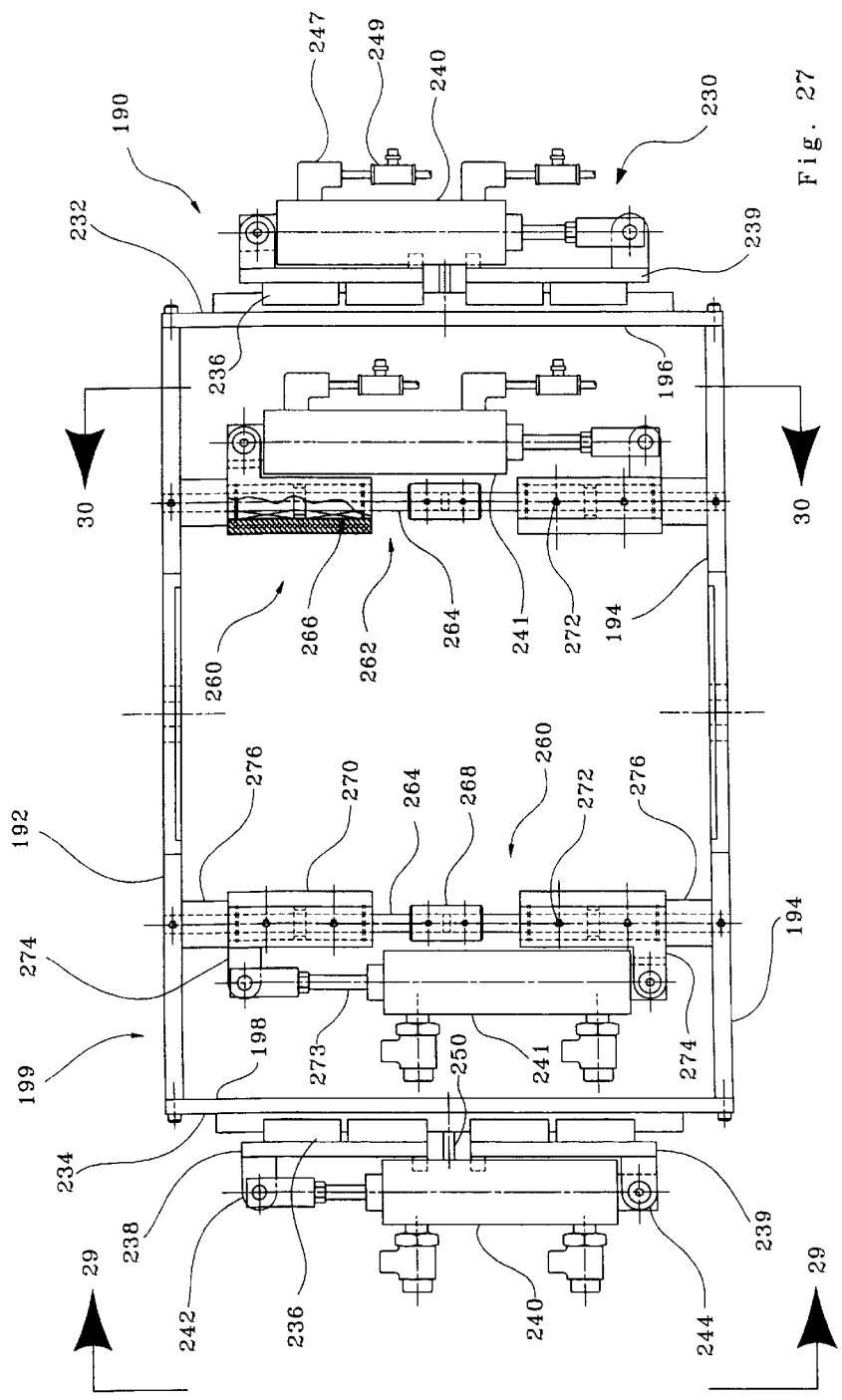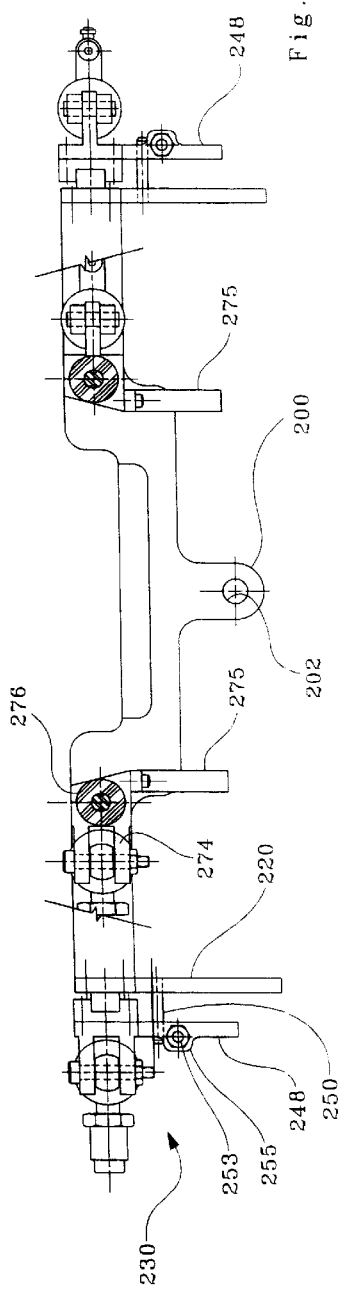

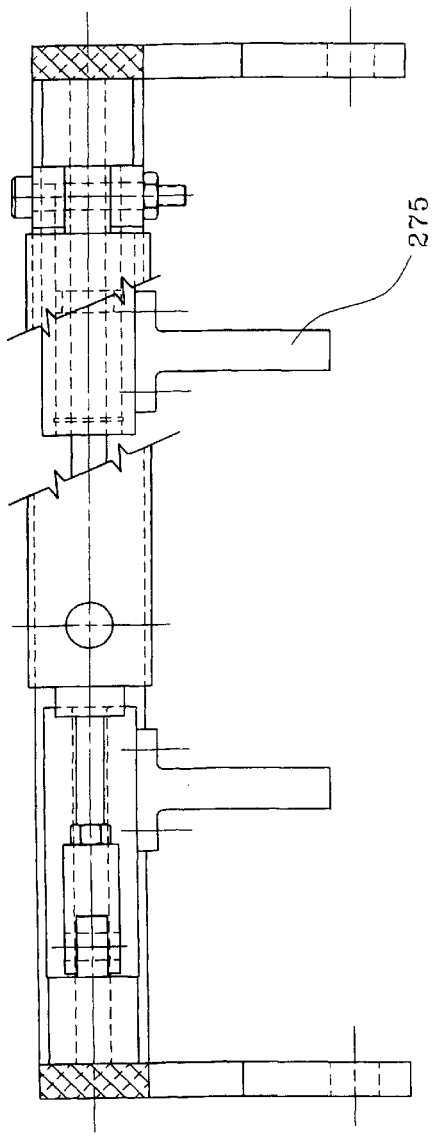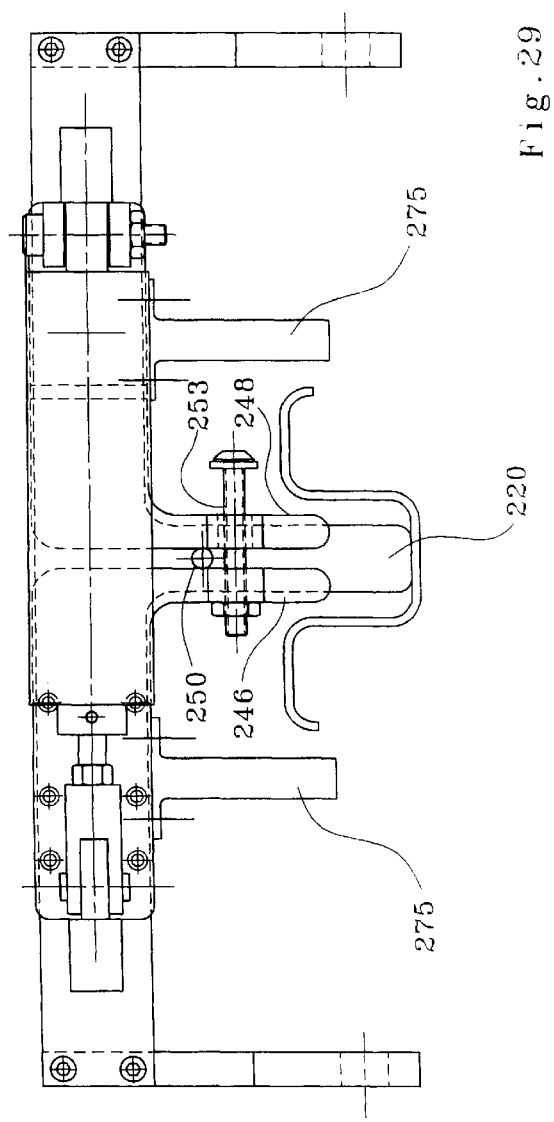

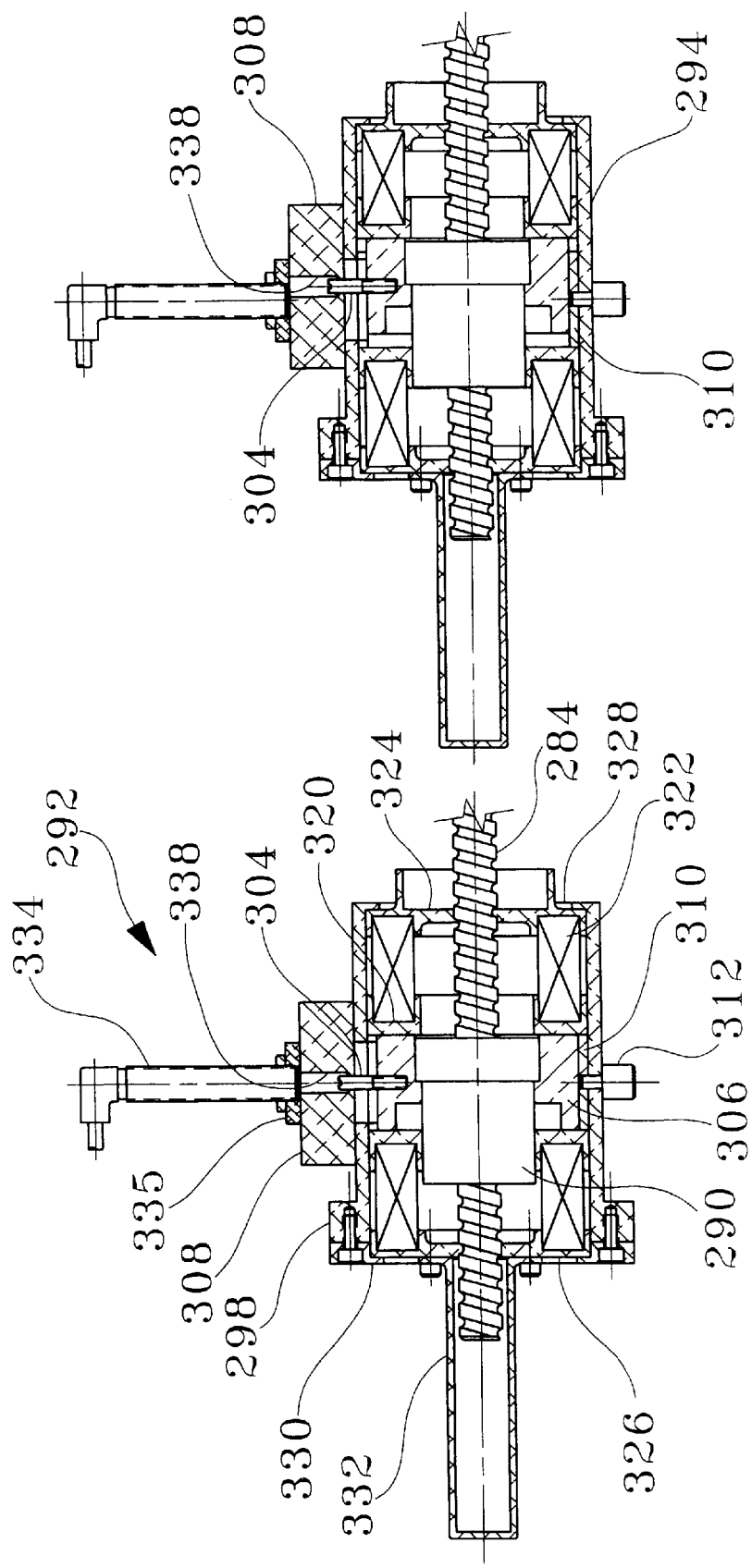

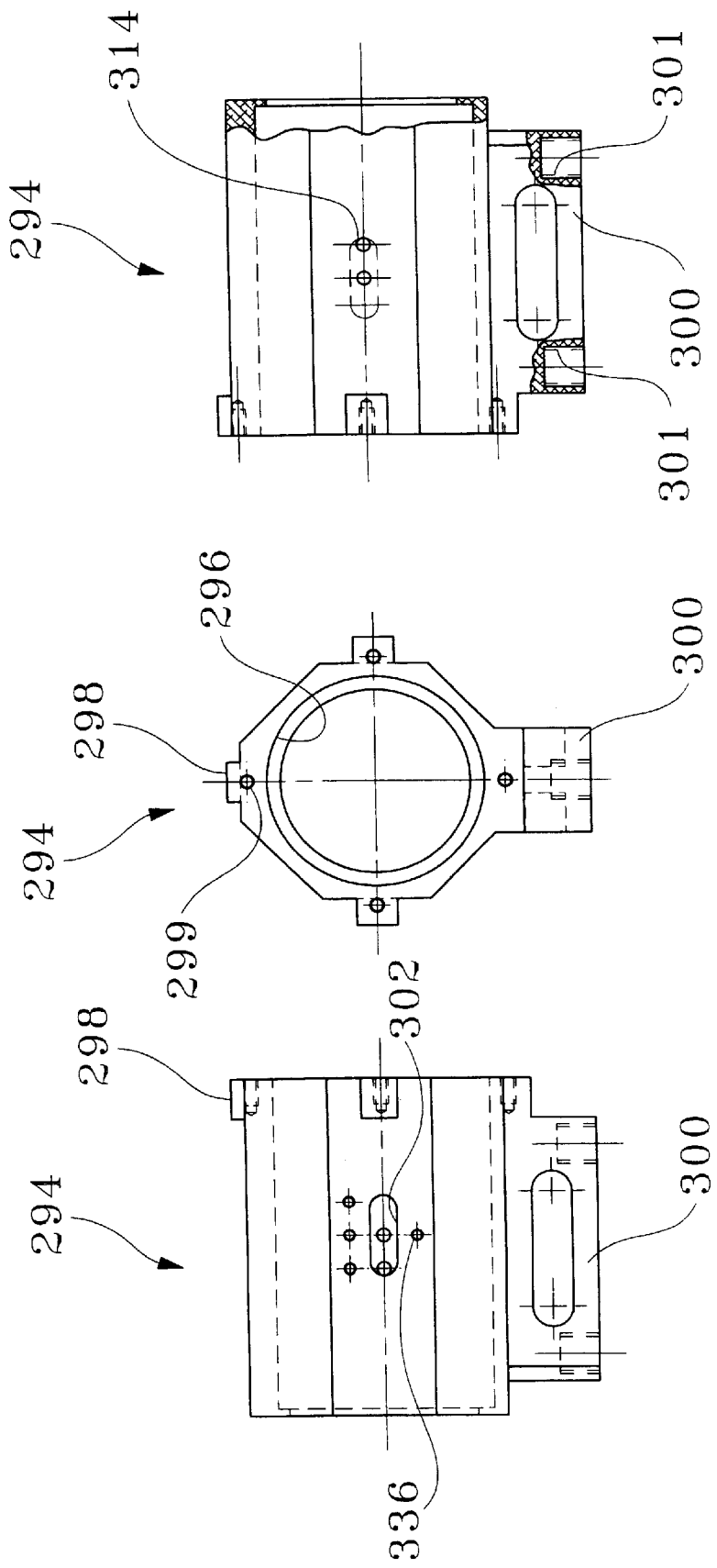

CONTOURED STRINGER/CLIP DRILLING

This is related to Provisional Application No. 60/051,177 filed on Jun. 28, 1997 entitled "Contoured Stringer/Clip Drilling".

This invention relates to airplane manufacturing, and more particularly to a method and apparatus for inserting stringer clips in curved stringers for the compound contoured sections of an airplane fuselage, and for match drilling holes used in riveting the stringer clips in the stringers.

BACKGROUND OF THE INVENTION

Recent developments in airplane manufacturing technology have enabled the fabrication of airplane fuselage sections with unprecedented precision. U.S. Pat. No. 5,560,102 entitled "Panel and Fuselage Assembly" issued on Oct. 1, 1996 to Micale and Strand discloses a breakthrough in fabrication technology which eliminates the need for expensive and error-prone hard tooling for fabricating airplane fuselage sections. This invention made it possible, for the first time in the history of airplane manufacturing, to build airplane fuselages to a specified tolerance without shims by building the individual panels within tolerance.

One of the steps of the process of the '102 patent noted above is to accurately position stringer clips in the channel of a stringer and to match drill holes through the stringer sidewalls and the stringer clip for subsequent fastener installation operations. An end effector for the machine tool shown in the U.S. Pat. No. 5,560,102 patent is shown in U.S. Pat. No. 5,127,139, entitled "Stringer Clip End Effector" issued on Jul. 7, 1992 to Peter McCowin and Hugh Schlosstein for performing these clip placement and drilling operations.

The end effector of the '139 patent performed well, accurately placing and drilling stringer clips in the stringers, but it used a significant amount of machine tool time in the assembly cell. To increase the capacity of the assembly cell for other operations as described in the '102 patent, the stringer/clip placement and drilling operations were removed from the assembly cell and performed in a dedicated machine that was invented and designed for that purpose. This dedicated machine is disclosed in U.S. Pat. No. 5,477,596 entitled "Stringer Clip Placement and Drilling" issued to Peter McCowin and Hugh Schlosstein.

The end effector of the '139 patent and the machine of the '996 patent were designed for straight stringers in the constant contour section of the airplane, shown in the left hand side of FIG. 1. However, the nose and the aft end of an airplane fuselage, shown in the right side of FIG. 1, have a compound contour that requires curved stringers. The webs of the stringer clips must be aligned on and parallel to the station planes, shown as a series of vertical lines in FIG. 1, since the airplane fuselage frame at each station plane is attached to the stringer clip webs aligned on that station plane, as shown in FIG. 2. In the constant contour sections of the fuselage, the orientation of all the clip webs is at a constant 90° to the axis of the stringer since the stringers lie at 90° to the frames. In the compound contour sections of the fuselage, however, the angle that the clip webs make with the stringer axis is different at different station planes since they must remain parallel to the station plane even though the stringer curves to conform to the compound contour of the fuselage. Moreover, the relative position of the pairs of holes drilled through the stringer sidewall and the stringer clip is different for the clips at different station planes, so in any automated system for placing and drilling the stringer clips in curved stringers, there must be some provision for accommodating these differences.

Thus, there exists a need for an automated apparatus and process for placing stringer clips at desired locations in desired orientations along a curved stringer for a compound contour section of an airplane fuselage and holding the clip at the desired location at the desired orientation while holes for subsequent fastener operations are drilled.

SUMMARY OF THE INVENTION

Accordingly, it is an object of this invention to provide a process and apparatus for inserting stringer clips into curved stringers for a compound contour section of an airplane fuselage at the desired position and orientation in the stringer, and for drilling holes in the stringer and clip for fastening the clip to the stringer at the desired position and orientation. Another object of this invention is to provide a compliance device that protects the end effector from impacts and overtravel. A further object of this invention is to provide an electrical motor brake for and electrical motor that quickly stops the rotation of the motor shaft when an overtravel or other abnormal condition is detected.

These and other objects of the invention are attained in a method and apparatus for inserting stringer clips into curved stringers for a compound contour or tapering section of an airplane fuselage. The fuselage has a longitudinal axis and multiple station planes lying normal to the axis, defined in a digital model of the airplane. The station planes define the position of fuselage frames which are fastened to webs of the stringer clips, in turn fastened in stringers, with the clip webs aligned with the station planes. To position and orient the clips accurately in the stringers, the stringer is placed in a fixture having locating surfaces for holding the stringer in the same configuration it will have when installed at its designated position in the airplane. The stringer is fixed longitudinally in the fixture at a known location, and station plane location data from the digital model is input to a CNC controller of a positioning device in a form that enables the CNC controller to move the positioning device to locations along the stringer corresponding to the station planes. A gripper of an end effector, carried by the positioning device, grips the web of the clip, picks up the clip, and aligns the web of the clip with the station plane, with the clip sidewalls parallel to the stringer axis at the desired point of insertion into the stringer. The stringer sidewalls are spread apart in the region of the desired point of insertion, and the clip is inserted into the stringer between the stringer sidewalls, with the clip web aligned with the station plane at the desired location. The stringer sidewalls are clamped on the clip, and two pairs of matched holes are drilled through the stringer sidewalls and the clip for subsequent fastener operations.

DESCRIPTION OF THE DRAWINGS

The invention and its many objects and advantages will become more apparent upon reading the following description of the preferred embodiment in conjunction with a study of the following drawings, wherein:

FIG. 5 is a close-up perspective view of the headers and clamps for holding the stringers in the desired position for inserting the stringer clips and match drilling;

FIG. 6 is a sectional side elevation of

FIG. 10 is a side elevation of the end effector along lines 10—10 in FIG. 9;

FIG. 11 is a side elevation along lines 11—11 in FIG. 9;

FIG. 12 is a partial side elevation of the clamp, partly in section, shown at the lower end of FIG. 9, in the open position;

FIGS. 13 and 13A are plan views of the end effector shown in FIG. 4, at later stages of construction than FIG. 8, showing the Z-axis carriage installed;

FIG. 21 is a left side elevation of the end effector shown in FIG. 25, without the swing frame and supporting hardware;

FIG. 22 is right side elevation of the structure shown in FIG. 21;

FIG. 25 is a front elevation of the partially built end effector showning the swing frame and supporting structures added to the structure shown in FIG. 17;

FIG. 26 is a right side elevation of the end effector shown in FIG. 25;

FIG. 27 is a plan view of the swing frame shown in FIG. 25, detached from the end effector;

FIG. 28 is a front elevation, partially in section, of the swing frame shown in FIG. 27;

FIG. 29 is a left side elevation of the swing frame, along lines 29—29 in FIG. 27;

FIG. 30 is a right side elevation of the swing frame along lines 30—30 in FIG. 27;

FIGS. 31 and 32 are sectional elevations of the compliance device shown in FIGS. 14 and 25;

FIGS. 33–35 are side and front elevations of the housing for the compliance device shown in FIGS. 31 and 32

DESCRIPTION OF THE PREFERRED EMBODIMENT

Figure 1:
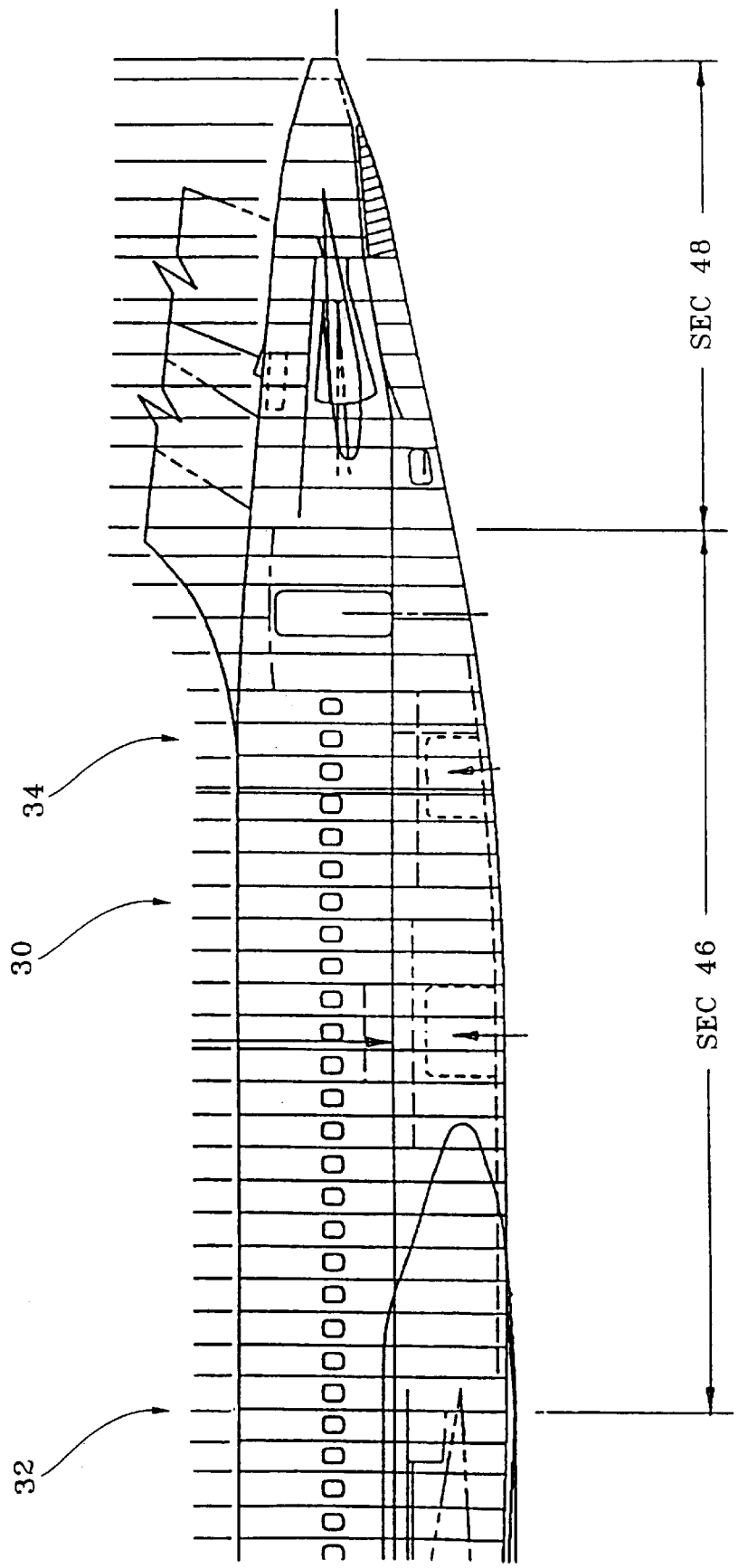
FIG. 1 is a side elevation of the aft end of an airplane fuselage showing, at the left side, a constant contour portion and, at the right side, a compound contour portion.
Figure 2:
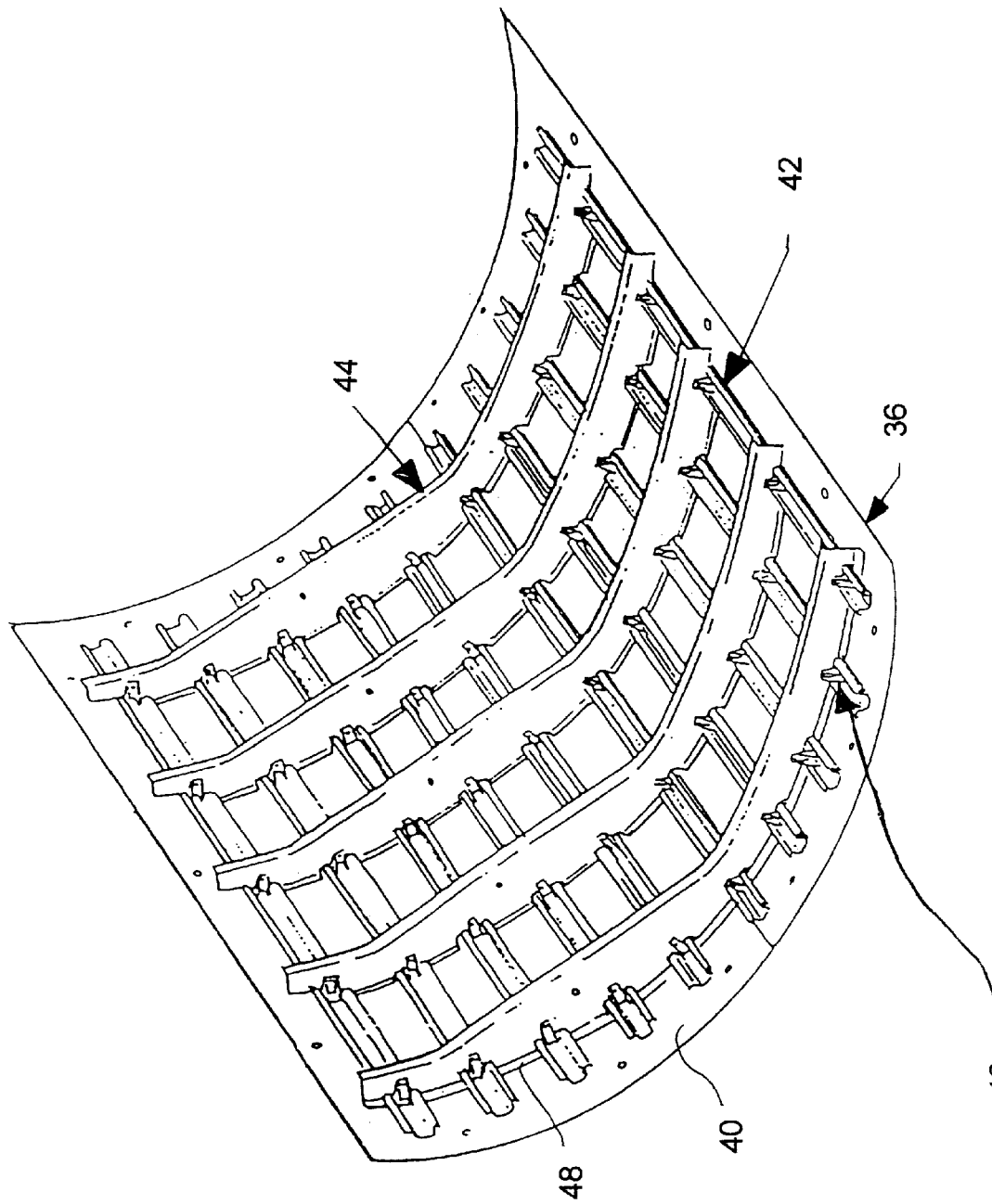
FIG. 2 is a perspective view of a fuselage panel showing frame members attached along station planes to stringer clips in stringers.

Turning now to the drawings, wherein like reference characters identify identical or corresponding parts, and more particularly to FIG. 1 thereof, an aft section of an airplane fuselage 30 is shown having a constant contour section 32 and a tapering tail section 34. The fuselage is made up from multiple panels 36 fastened together with lap and butt joints. Each panel 36, one of which is illustrated in FIG. 2, has one or more skins 40 to which multiple "hat-section" stringers 42 are fastened by riveting. Frame members 44 are fastened to stringer clips 46 which, in turn, are fastened in the channel of the stringers 42. The frame members 44 are also fastened to shear ties 48 which in turn are riveted to the skins 40. Fuselage panels 36 made in this way are light weight, strong and damage tolerant; they are exceptionally well suited for airplane fuselage construction.

Figure 3:
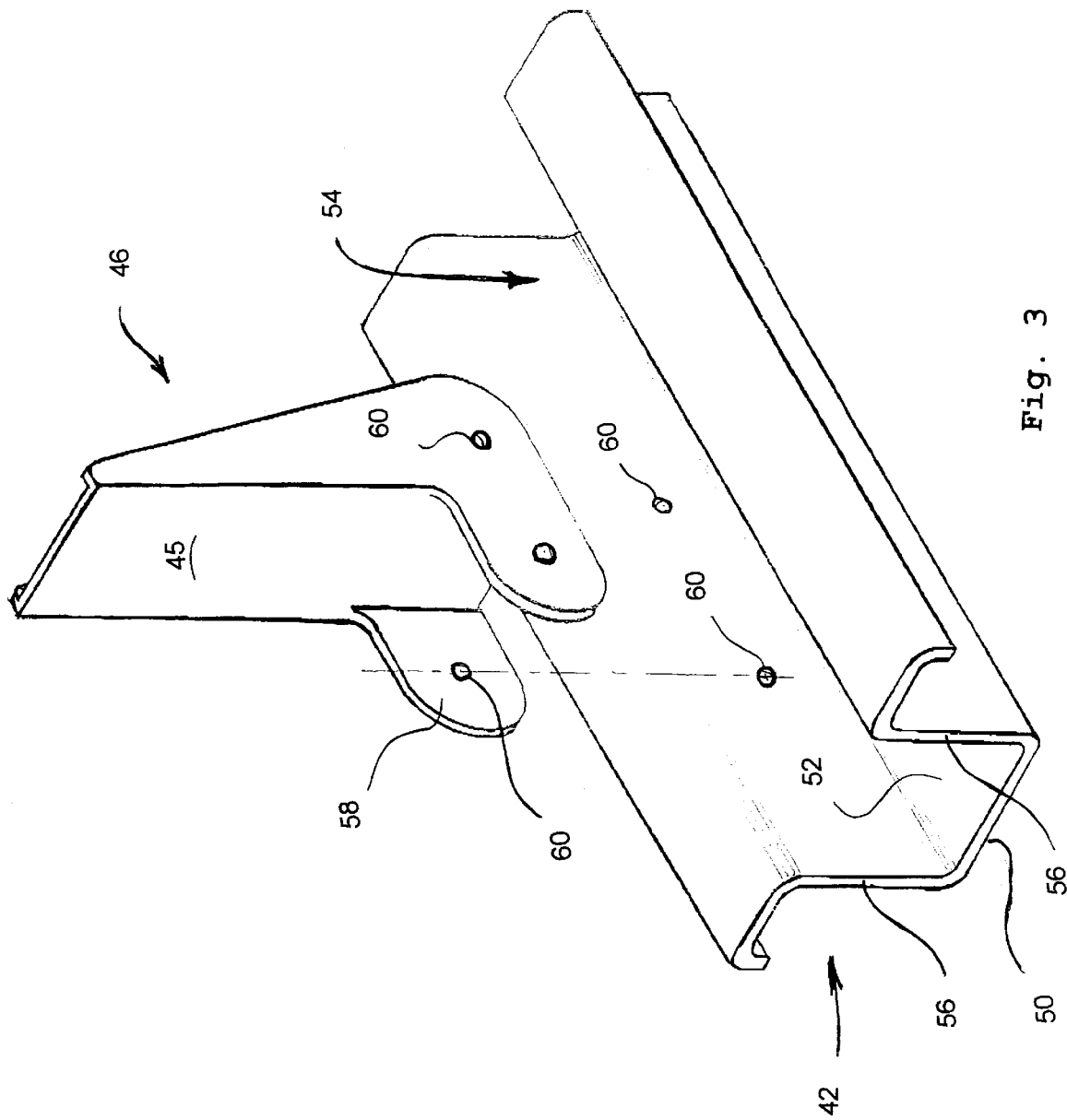
FIG. 3 is a perspective view of a portion of a stringer and a stringer clip exploded out of the stringer channel to show the details of the stringer clip.

In the compound contour sections at the nose and aft ends of the airplane fuselage, the stringers are curved to conform to the shape of the fuselage along which the stringer lies. As shown in FIG. 3, the "hat section" stringers 42 each have a skin contact surface 50 which engages and is riveted to the inside surface of the fuselage skin 40. The skin contact surface 50 is the underside of the floor 52 of the channel 54 between two upstanding sidewalls 56.

The stringer clips 46 are inserted between the stringer sidewalls 56, as shown in FIG. 3, and are riveted in place by two rivets through each of the sidewalls 56 and through the sides or "wings" 58 projecting from a web 45 of each stringer clip 46. The rivets are installed through holes 60 match drilled through the stringer sidewalls 56 and through the sides 58 of the stringer clip 46. The term "match drilled" means drilling holes through both parts at the same time while they are clamped together. Match drilling has the advantage of speed, accuracy and the avoidance of interlaminar burrs, or drill chips that intrude into the interface between the two parts. By clamping the parts together while drilling, interlaminar burrs may be minimized or prevented. The holes 60 can be undersized coordination holes that can later be used as pilot holes for the actual fastener holes if the fastening operations are to be performed later, or preferably they can be full sized fastener holes if the fastening is to be done concurrently with or immediately after the drilling. In this embodiment, the holes 60 are full sized fastener holes.

The clips are marked for their particular location along the stringer and are removed and taken to another machine for riveting. This is merely for temporary convenience, since the separate riveting operation and equipment already exists and a separate riveting machine for the assembly cell shown in FIG. 4 for stringer clips has not yet been built. However, it is contemplated that all drilling and riveting operations will eventually be performed in the assembly cell concurrently while the stringer is being drilled.

Figure 4:
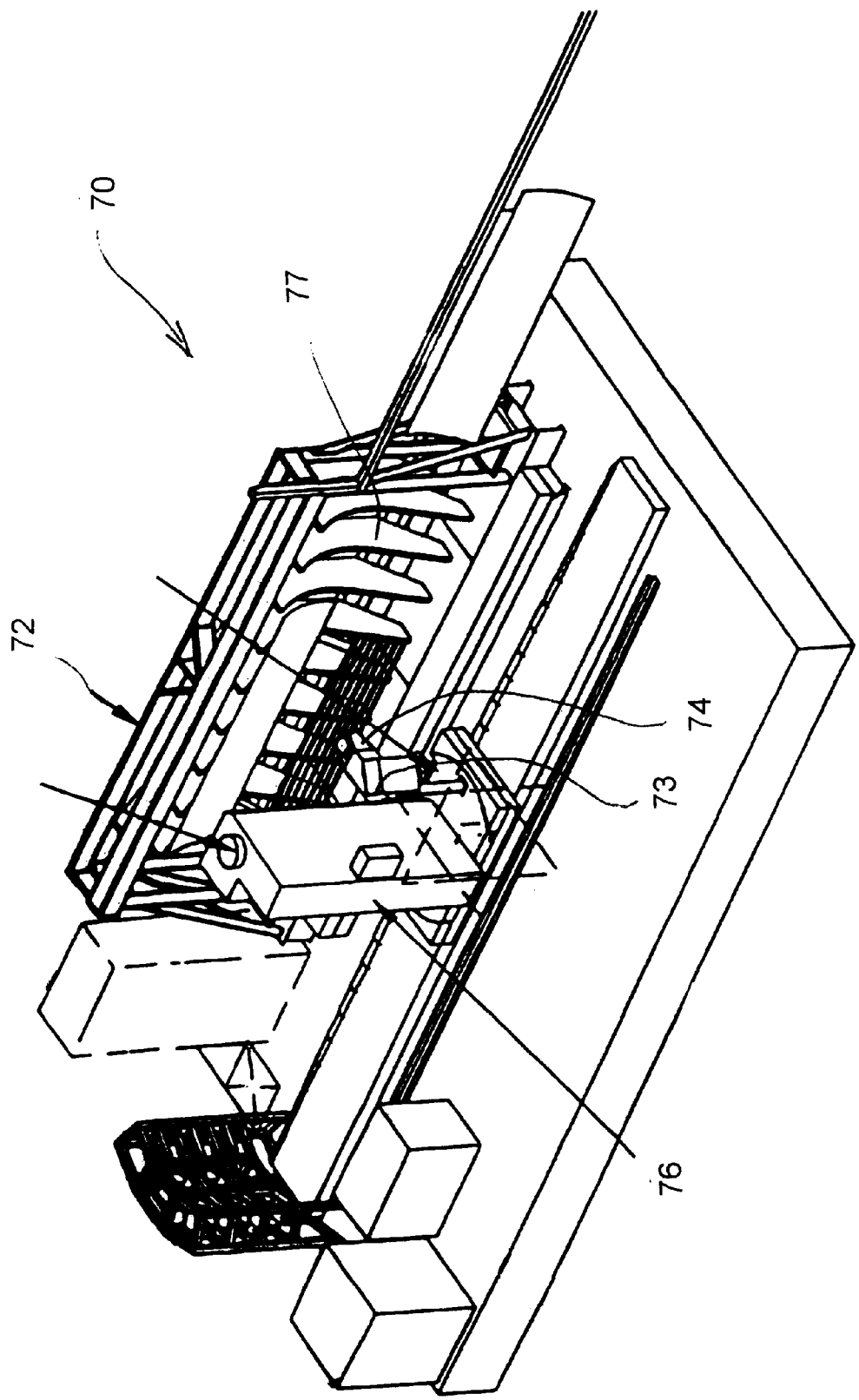
FIG. 4 is a perspective view of a work cell in accordance with this invention.
Figure 6:
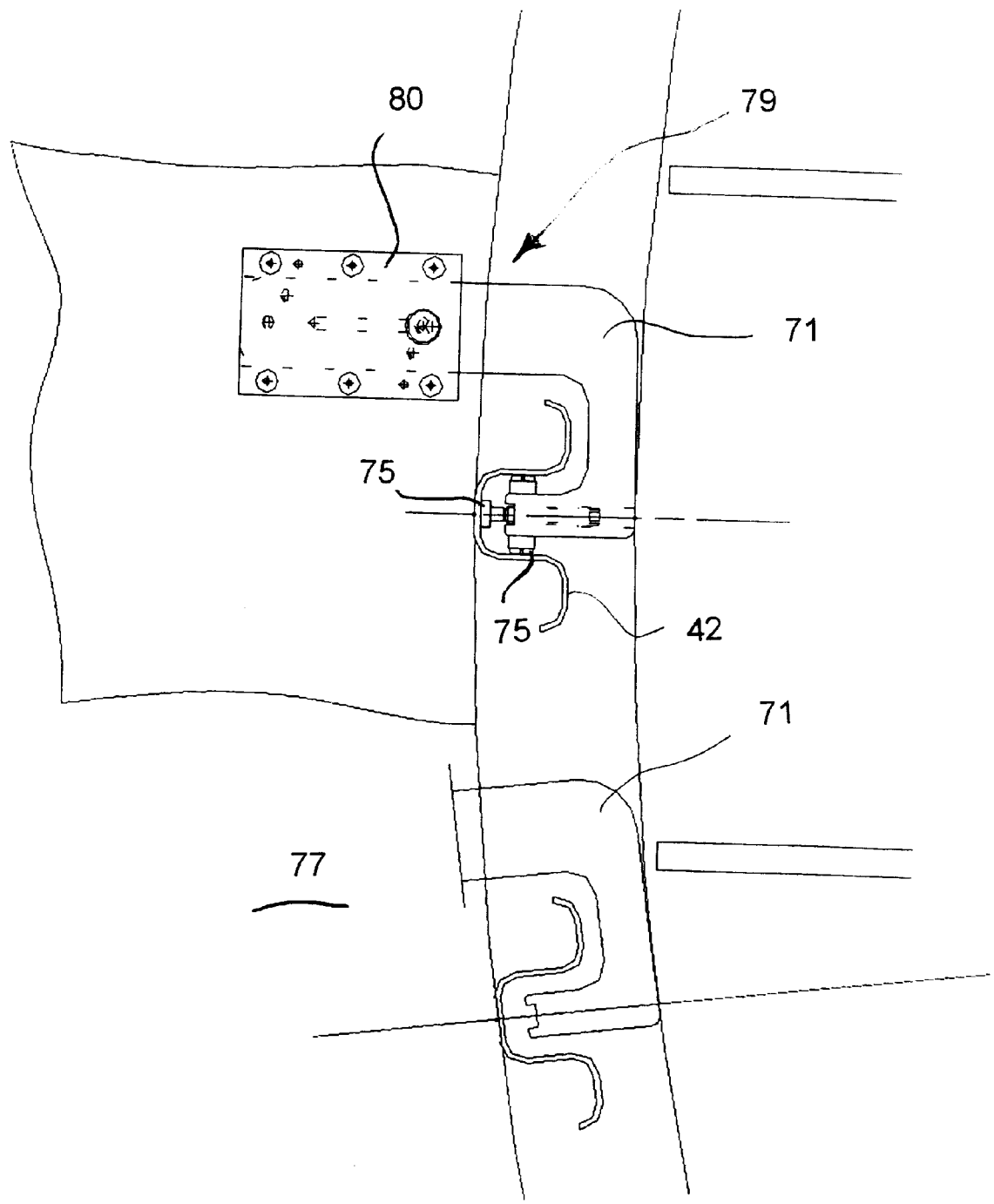

Turning now to FIGS. 4 and 5, an assembly cell 70 is shown having a fixture 72 for holding the stringers at a known position while an end effector 74 on the end of an arm 73 manipulated by a precision positioning apparatus such as a 5-axis machine tool 76 accurately places the stringer clips 46 in the stringers 42, and holds the clips 46 at the correct orientation while drilling holes for fastening the clips in the stringers, as further described in detail below. The fixture 72 has a series of headers 77, shown in more detail in FIG. 6, having accurately machined locating surfaces 78. Clamps 79 mounted on the headers 77 have clamp bars 71 that hold the stringers against the locating surfaces 78 on the headers 77 in a curved configuration that is the same as the configuration it will have when installed at its designated position in the airplane fuselage 30. The clamp bars 71 slide in holders 80 between a clamping position, shown in the top clamp in FIGS. 5 and 6, and a release position shown in the bottom clamp in FIG. 5, for loading and unloading the stringers 42 onto the fixture 72. Each clamp 79 has buttons 75, which may be adjustable, for engaging the stringer surfaces and holding the stringers at exactly the desired position on the fixture 72. A locating pin or end stop 82 in the fixture, shown in FIG. 4, engages a reference surface on the stringer 42, such as an accurately drilled coordination hole or a machined end surface, to accurately position the stringer longitudinally on the locating surfaces 78 on the headers 77 of the fixture 72.

Figure 7:
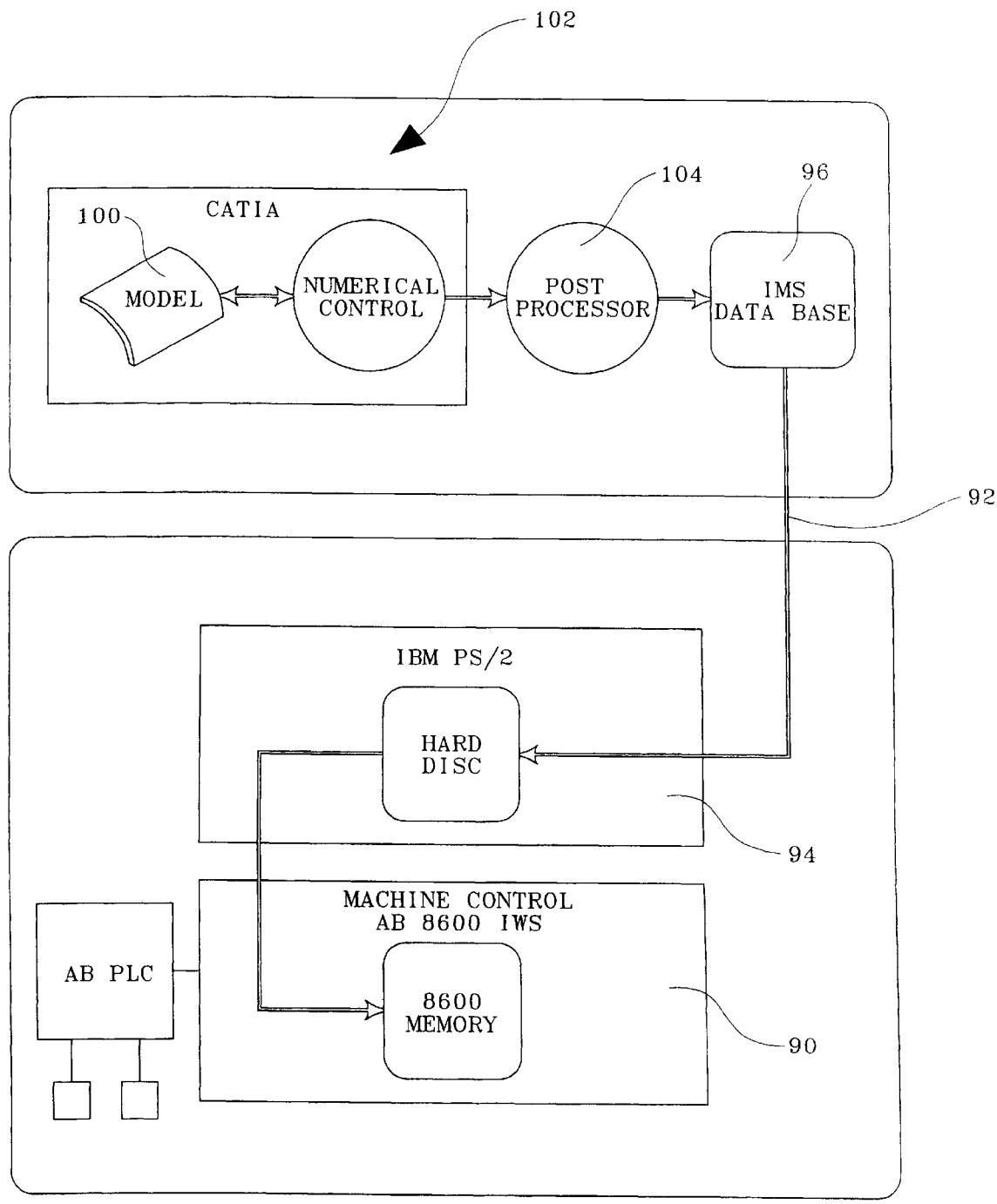
FIG. 7 is a schematic diagram of the control architecture for the work cell shown in FIG. 4.
Figure 8:
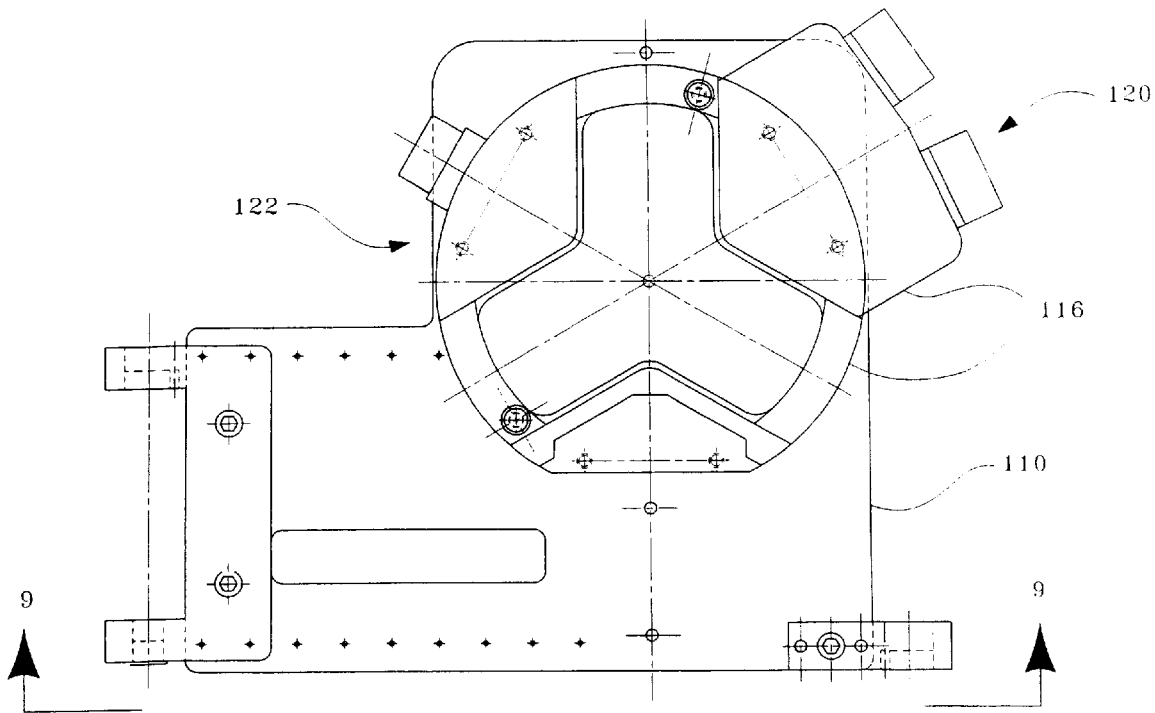
FIG. 8 is a plan view of the end effector shown in FIG. 4, partially built, showing the coupling device by which the end effector is coupled to the machine tool arm.

The locating surfaces are accurately machined using the same machine tool 76 when the cell 70 is being set up to assemble clips in stringers for a particular model airplane. A control system, shown in FIG. 7, for the machine tool includes a controller 90 such as an Allen-Bradley 8600 CNC which receives a part program over an ethernet connection 92 via a workcell PC 94 such as an IBM PS/2 from an IMS data base 96. The part program in the IMS data base 96 is based on a digital model 100 of the airplane residing in a master engineering computer system 102 which is the ultimate engineering authority for the airplane configuration and on which all airplane tooling and part information is based. Data from the digital model 100 is used by a post processor 104 to produce the part programs stored in the IMS data base 96 which is transmitted through the ethernet connection 92 and the work cell PC 94 to the CNC controller 90 and used by the controller to move the end effector 74 and operate its various functions, as described below. This architecture is similar to that described in U.S. Pat. No. 5,560,102 noted above.

The end effector 74 shown in FIG. 4, and shown in more detail in FIGS. 8–26, includes a frame that has a main plate 110 and a depending structural post 112 fastened rigidly to the underside 114 of the main plate and extending parallel to a Y-axis perpendicular to the main plate 110. The post 112 has an I-shaped cross-section in plan, with a center web and two side flanges. A coupling device 116 is attached to the upper side 118 of the main plate 110 for attachment of the end effector 74 to the arm 73 of the machine tool 76. The coupling device shown is a standard Omega II tool adapter having an electrical coupling module 120 for supplying electrical power and electrical control signals, and a pressurized air coupling 122 for conveying pressurized air for powering air motors and pneumatic cylinders in the end effector in a known manner and as described below.

Figure 9:
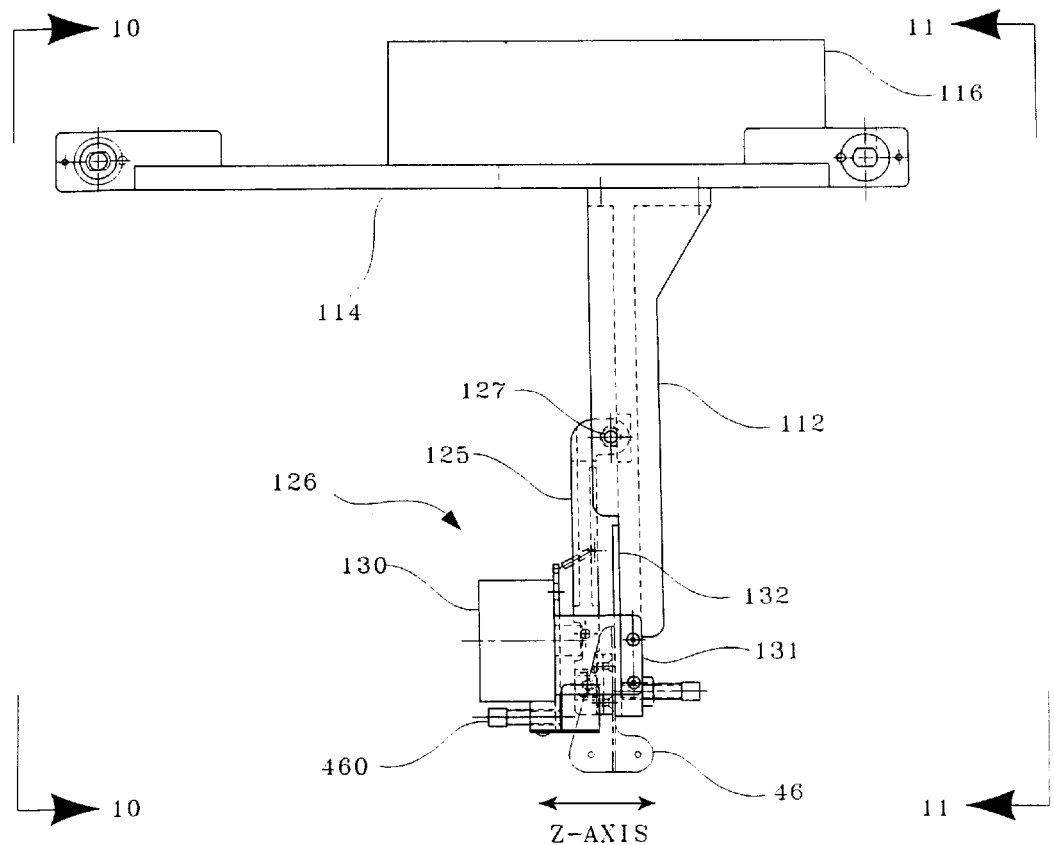
FIG. 9 is a front elevation of the partially built end effector shown in FIG. 8 along lines 9—9 in FIG. 8.
Figure 13:
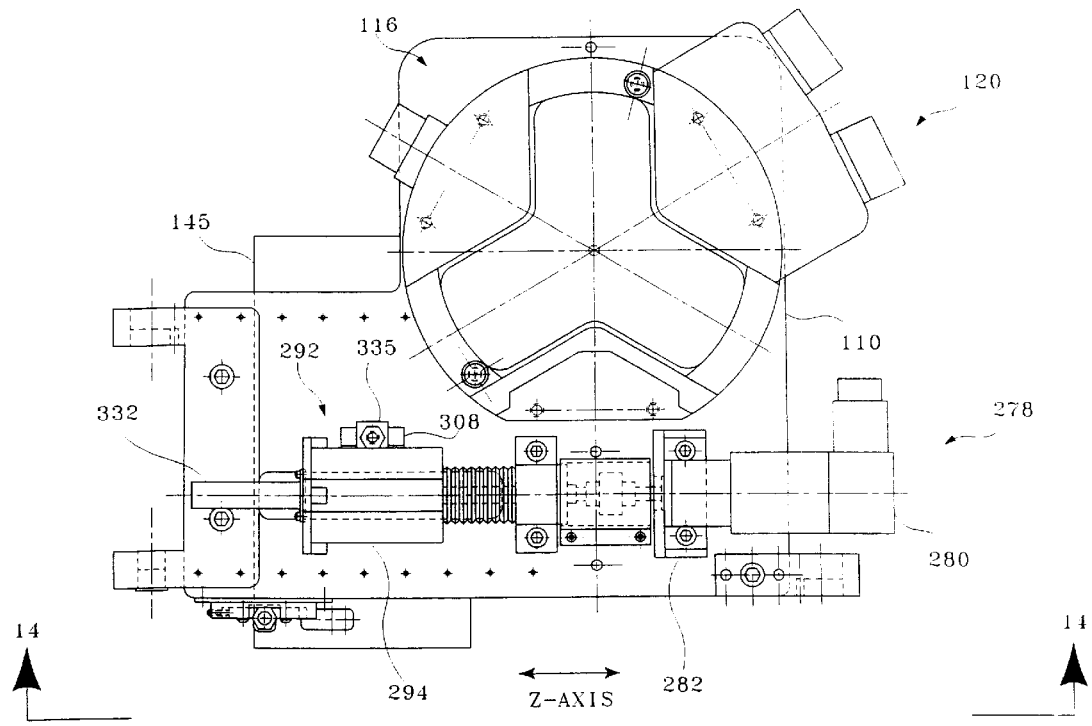
Figure 14:
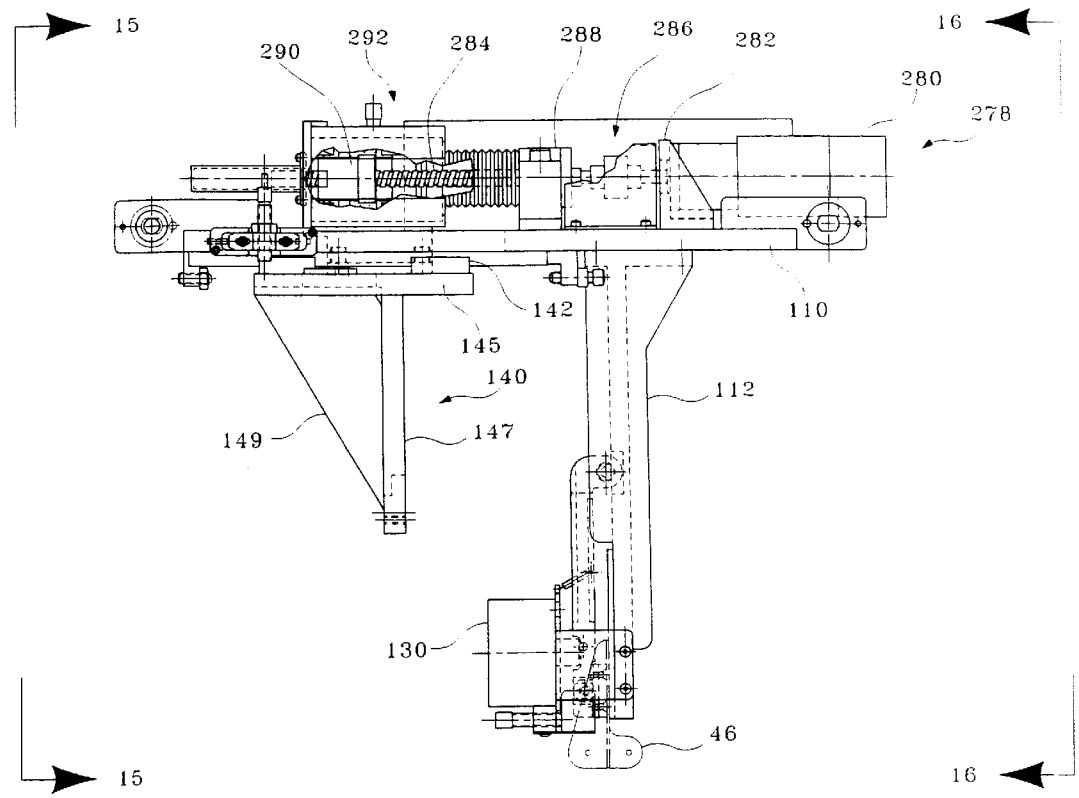
FIG. 14 is a front elevation of the partially built end effector shown in FIG. 13 along lines 14—14 in FIG. 13.
Figure 16:
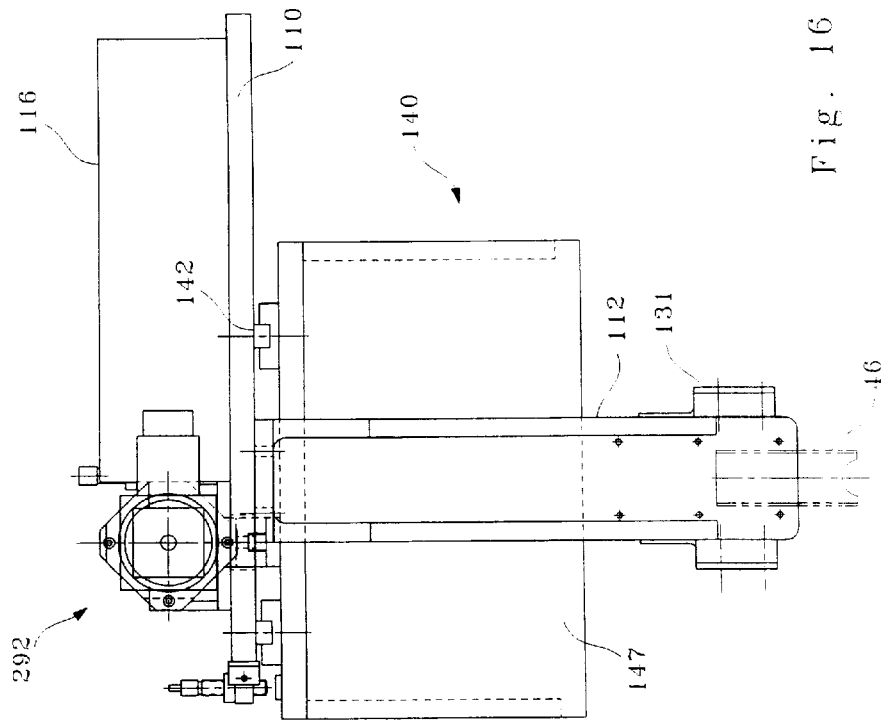
FIG. 16 is side elevation along lines 16—16 in FIG. 14.
Figure 15:
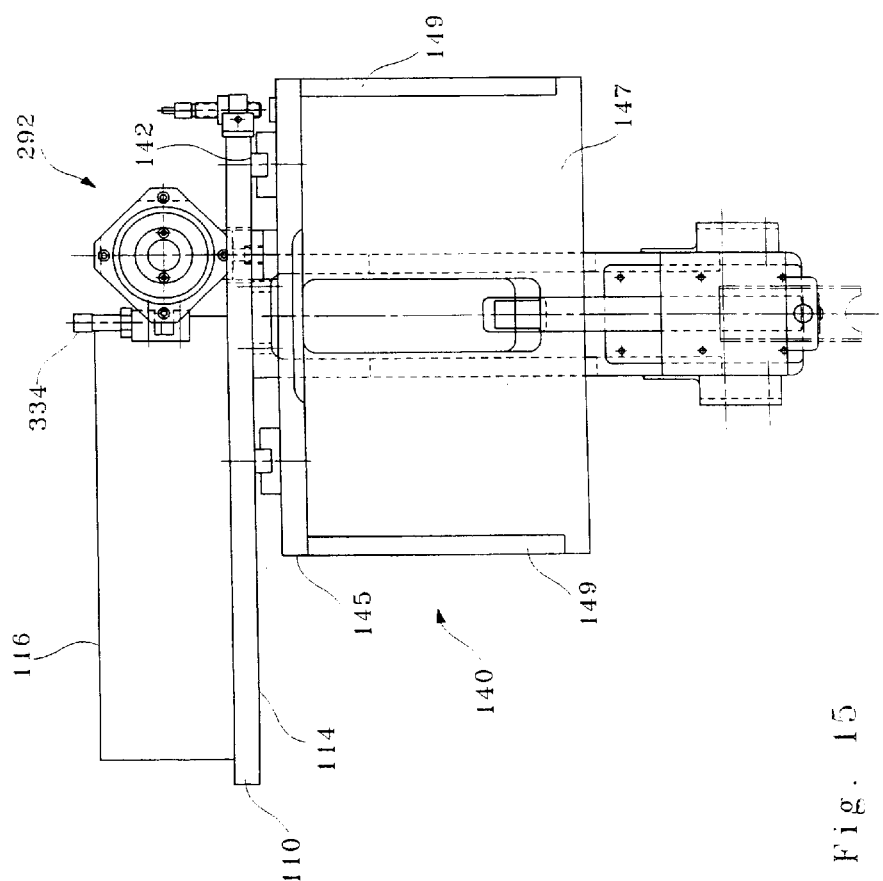
FIG. 15 is a side elevation along lines 15—15 in FIG. 14.
Figure 13:
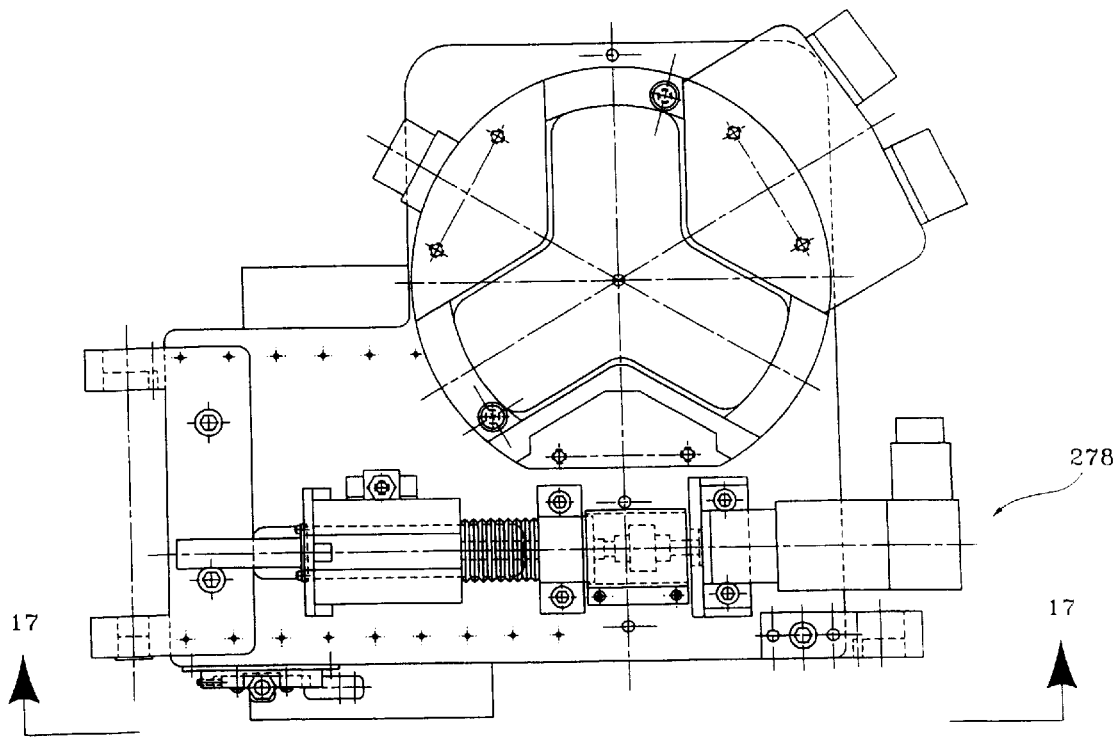

For convenience, the end effector 74 is described in a particular orientation with the main plate 110 oriented horizontally. In fact, the end effector 74 can be and is used in many orientations. Thus, the "under side" of the 114 main plate could more generally be called the "operating surface" and the upper side 118 of the main plate could be called the "coupling surface", as used in the claims. However, the terms "upper side" and "under side" will be used in the specification, along with related positional terms for the other parts since they relate so clearly to the drawings, with the understanding that no limiting effect should be attached to these terms. The more precise terms indicating direction are the orthogonal X, Y, and Z axes. The Y-axis, shown in FIG. 11, is vertical or perpendicular to the main plate 110. The Z-axis, shown in FIG. 9, is generally parallel to the main plate 110 and the stringer axis, and perpendicular to the Y-axis. The X-axis, also shown in FIG. 11, is generally transverse to the stringer axis and parallel to the main plate 110.

The drawings illustrate the end effector 74 in successive stages of construction, starting with the basic frame and progressing in later views adding elements as they are described. This manner of description is for clarity of explanation and does not necessarily describe the assembly sequence.

For gripping a stringer clip 46, a clamp arm 125 of a clamp 126, shown in FIGS. 9–12, is pivotally attached to the structural post 112 at a pivot 127 extending between the two flanges of the post 112. The clamp arm 125 is operated from an open position shown in FIG. 12 to a closed position shown in FIG. 9 by a pneumatic cylinder 130 fastened to a yoke 131 which brackets the clamp arm 125 and is fastened to the lower end of the post 112. The pneumatic cylinder 130 operates to rotate the clamp arm 125 about its pivot 127 and press a polyurethane gripping pad 134 on the lower end of the clamp arm, as shown in FIG. 12, against the web 45 of a stringer clip 46 to clamp the clip against a hardened steel face plate 132 fastened to the lower end of the structural post 112. A leaf spring (not shown) at the upper end of the clamp arm 125 opens the clamp by rotating the clamp arm 125 about its pivot 127 when the pressure in the pneumatic cylinder 130 is vented. Alternatively, the cylinder 130 could be a double acting cylinder to positively open under pressure when it is not powered to the closed position.

Turning now to FIGS. 13–16, a Z-axis carriage 140 is shown mounted on the under side 114 of the main plate 110 with linear bearings 142 which permit smooth lineal motion of the Z-axis carriage 140 in the Z-direction. The Z-axis carriage 140 has a top plate 145 supported by the linear bearings 142 under the main plate 110, and a vertical plate 147 depending from an intermediate position under the top plate 145. Two triangular end gussets 149 are welded in place to brace the vertical plate 147 on the top plate 145. The Z-axis carriage 140 is moved in the Z-direction by a Z-axis drive mechanism 278 which is described in detail below.

Figure 17:
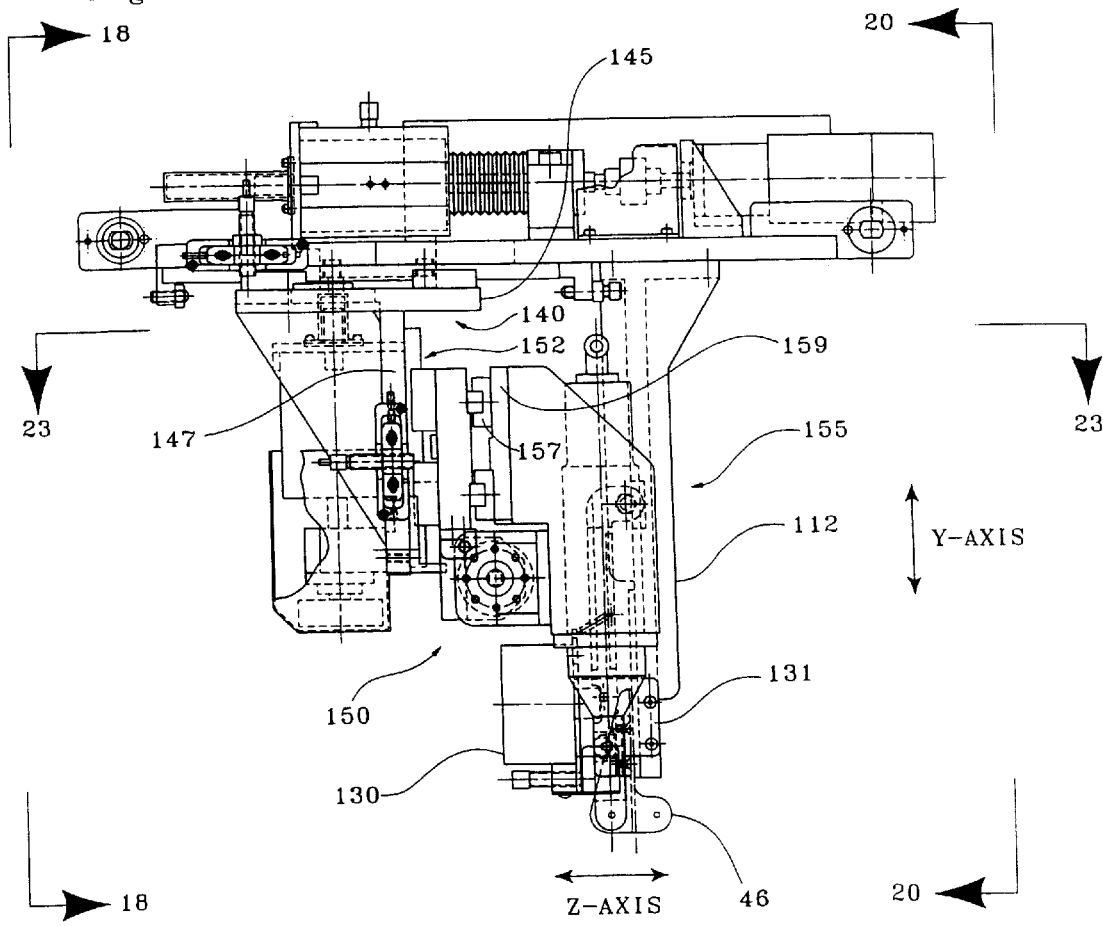
FIG. 17 is a front elevation of the partially built end effector shown in FIG. 13A along lines 17—17 in FIG. 13A.
Figure 20:
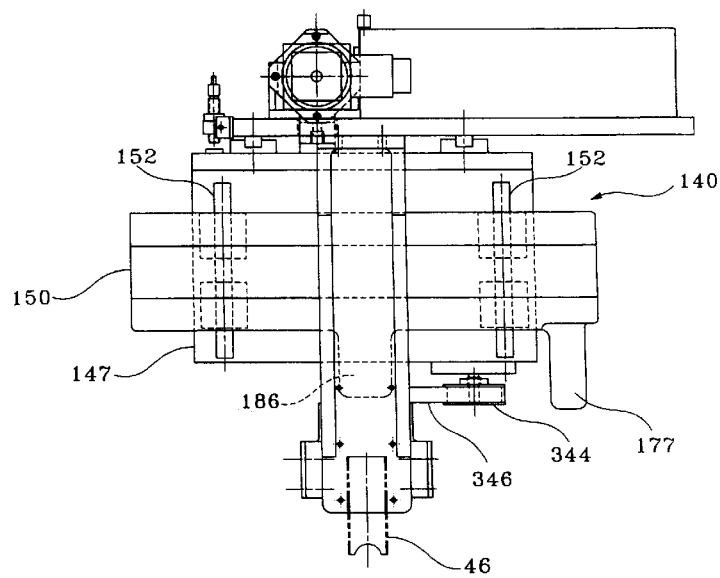
FIG. 20 is a right side elevation along lines 20—20 in FIG. 17.
Figure 23:
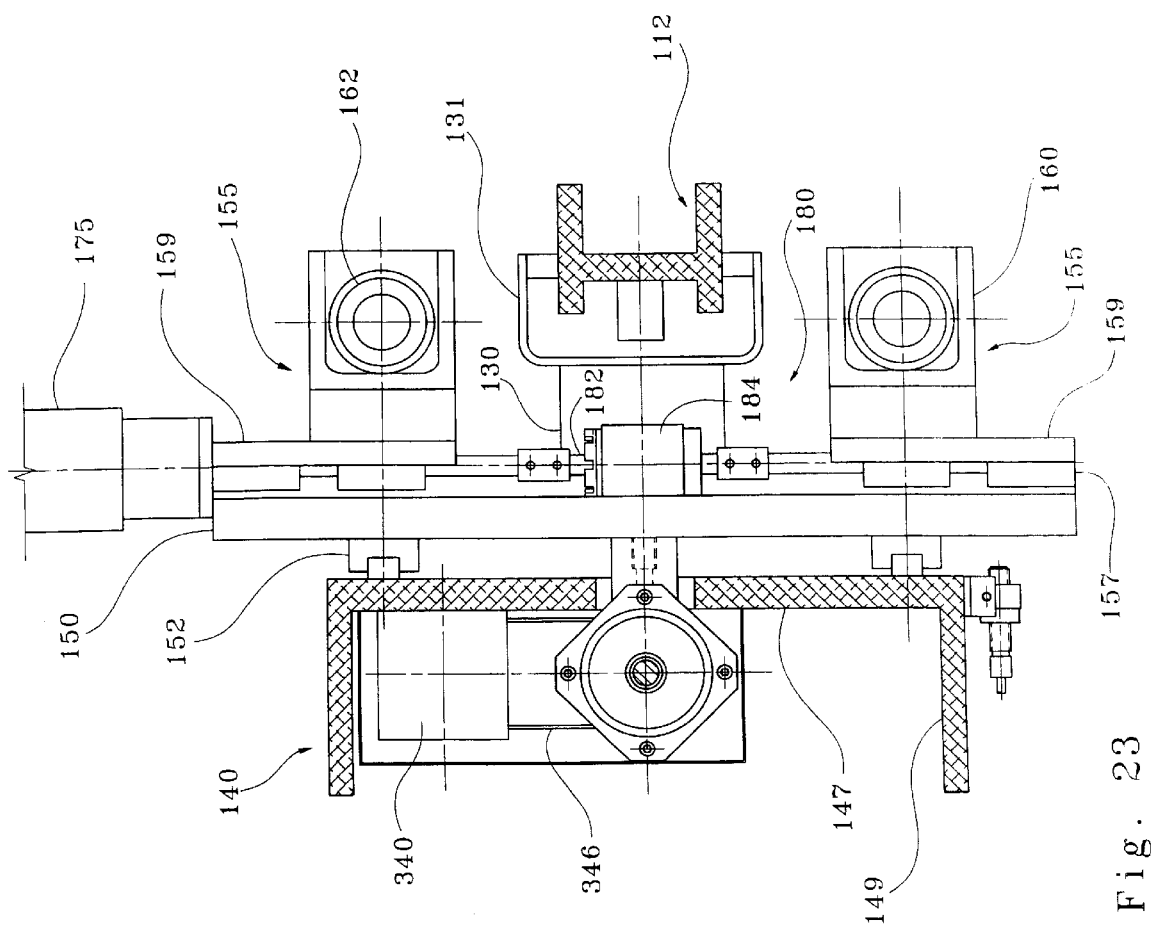
FIG. 23 is a plan view along lines 23—23 in FIG. 17.

A Y-axis carriage 150, shown most clearly in FIGS. 17 and 20, is mounted for vertical motion, or more particularly, Y-axis motion, on the vertical plate 147 of the Z-axis carriage 140 by way of linear bearings 152. The Y-axis carriage 150 has a pair of drill carriages 155, each mounted on linear bearings 157 for controlled movement parallel to the X-axis for drilling a pair of holes through the stringer side walls and the sides of the stringer clip, as described in detail below. As shown in FIGS. 17, 22 and 23, each drill carriage 155 includes a back plate 159 to which the linear bearings 157 are attached, and a support block 160 attached to the back plate 159. The support blocks 160 each have a vertical bore into which an air powered drill 162 fits and is fastened by a flange 164 on the drill motor casing. An air fitting 166 on each drill provides means for powering the pneumatic vane type drill motors, and an oil injection port 168 provides access for injecting measured quantities of oil into the incoming air to the air motor for lubrication. A right angle drive 170 at the lower end of each of the drills 162 holds and drives opposed drill bits 172 toward each other parallel to the X-axis and at a 90° angle to the axis of the drill 162.

Figure 24:
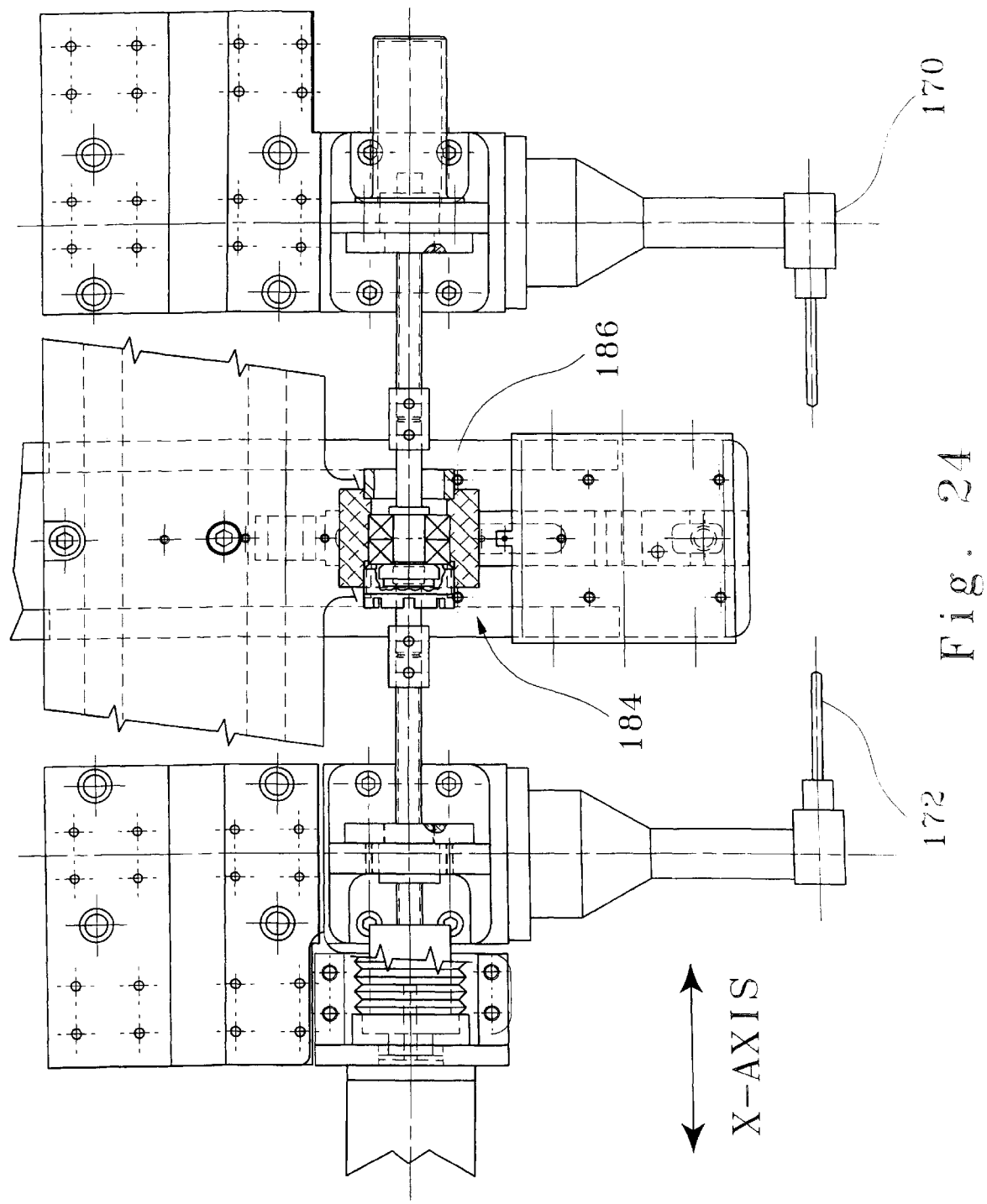
FIG. 24 is a partially broken-away left side elevation of the structure shown in FIG. 21, showing details of the drill feed mechanism.
Figure 36:
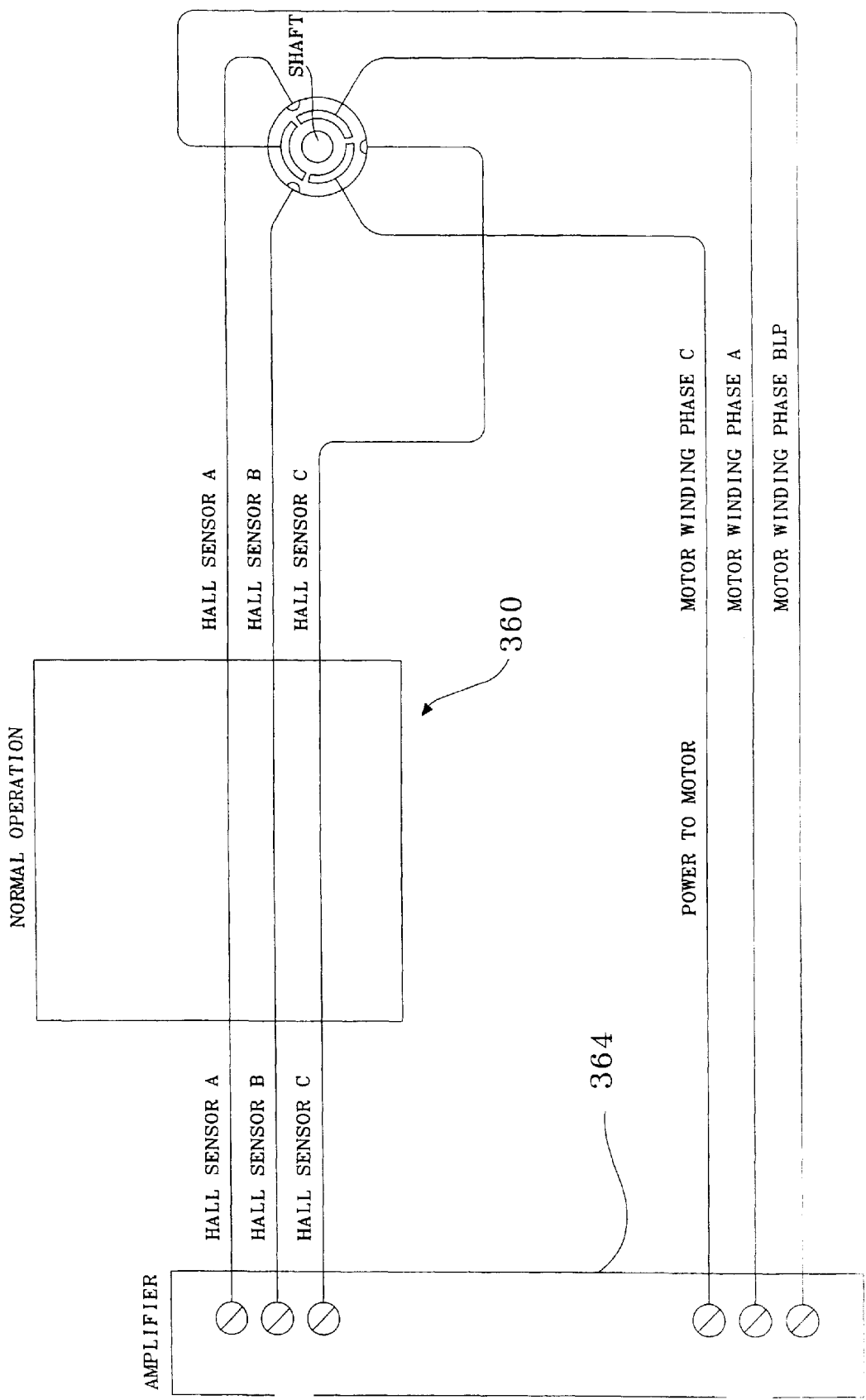
FIGS. 36–38 are schematic diagrams of an electrical brake on a servomotor that quickly stops the rotation of the motor armature.
Figure 37:
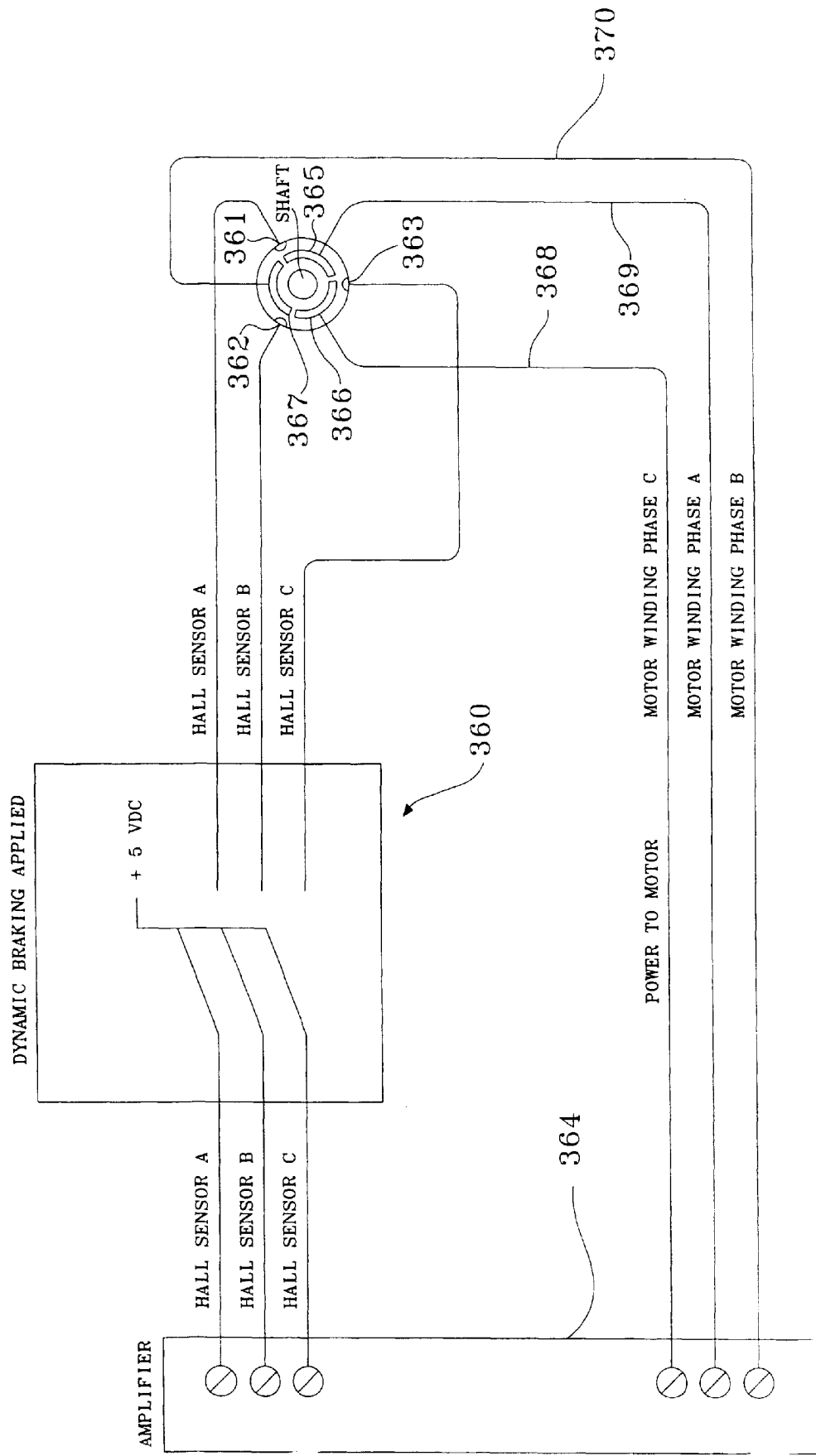
Figure 38:
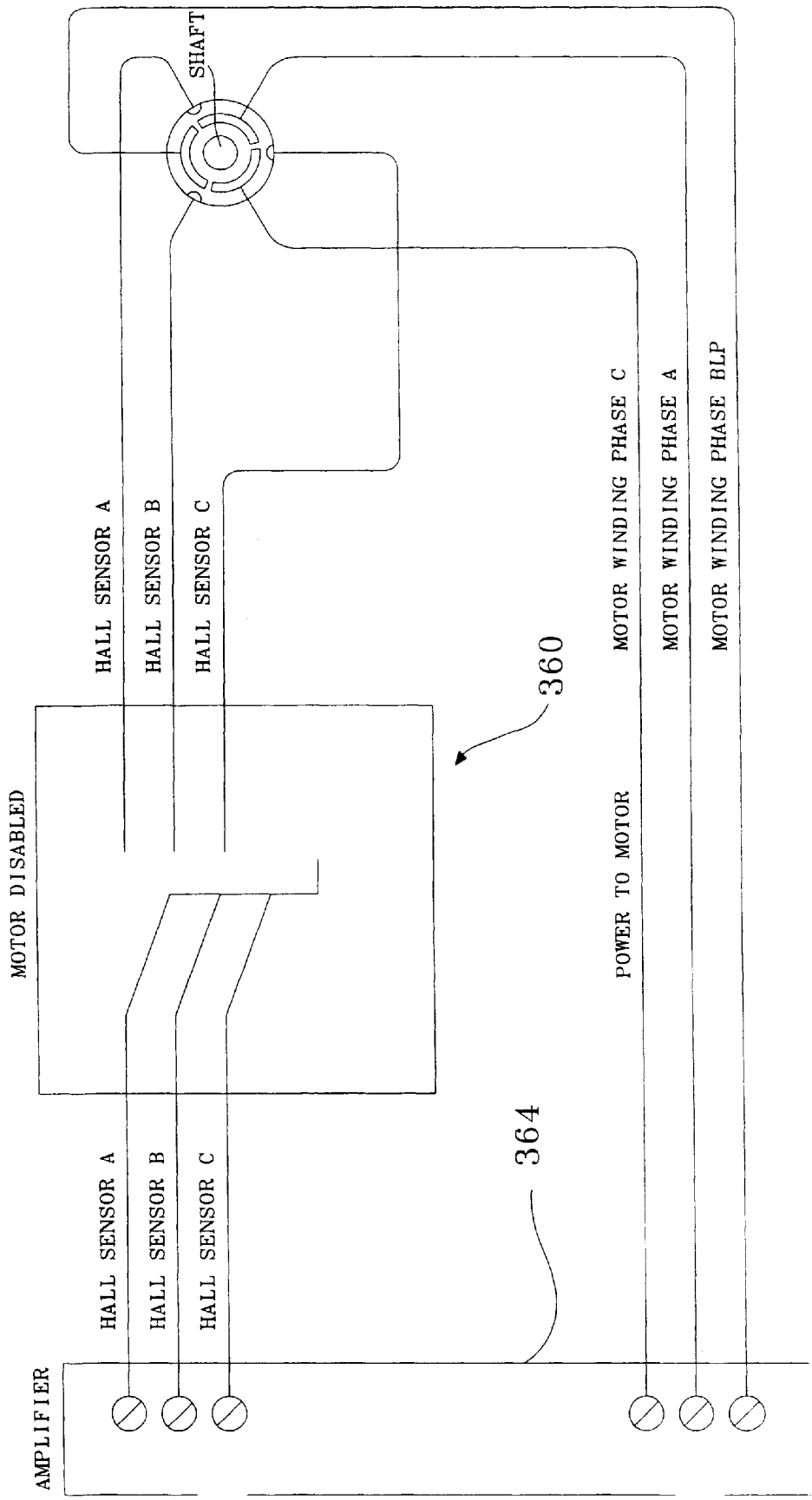

A drill feed servomotor 175 is fastened to a depending mounting tongue 177 on the Y-axis carriage 150 for driving the drills 162 toward and away from each other along a line of action parallel to the X-axis to drill the holes through the stringer side walls and the stringer clips. The spindle of the servomotor 175 is coupled to a lead screw assembly 180, shown in FIG. 23, which includes two lead screws with opposite hand threads, connected to a central stub shaft 182 supported in a central bearing 184. The bearing 184 is mounted on a central depending mounting tongue 186 on the Y-axis carriage 150, as seen in FIGS. 22–24.

A swing frame 190, shown attached to the end effector 74 in FIGS. 25 and 26, and shown detached in FIGS. 27–30, engages the stringer 42 with contact posts in hard contact with the fixture 72, spreads the side walls of the stringer 42 with spreader bars in preparation for inserting the stringer clip 46, and after insertion of the clip 46, clamps the side walls of the stringer 42 on the clip with clamp bars to prevent interlaminar burrs from intruding between the stringer side walls and the sides of the clip 46.

Figure 40:
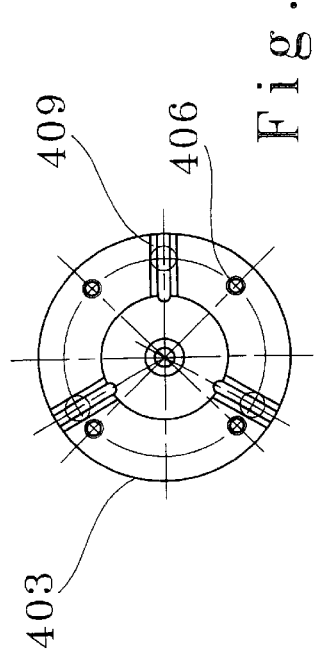
FIG. 40 is is a plan view of the hardened steel V-groove plate in the compliance device shown in FIG. 39.
Figure 41:
FIG. 41 is a fragmentary elevation of the ball-nose pin in the compliance device shown in FIG. 39.
Figure 39:
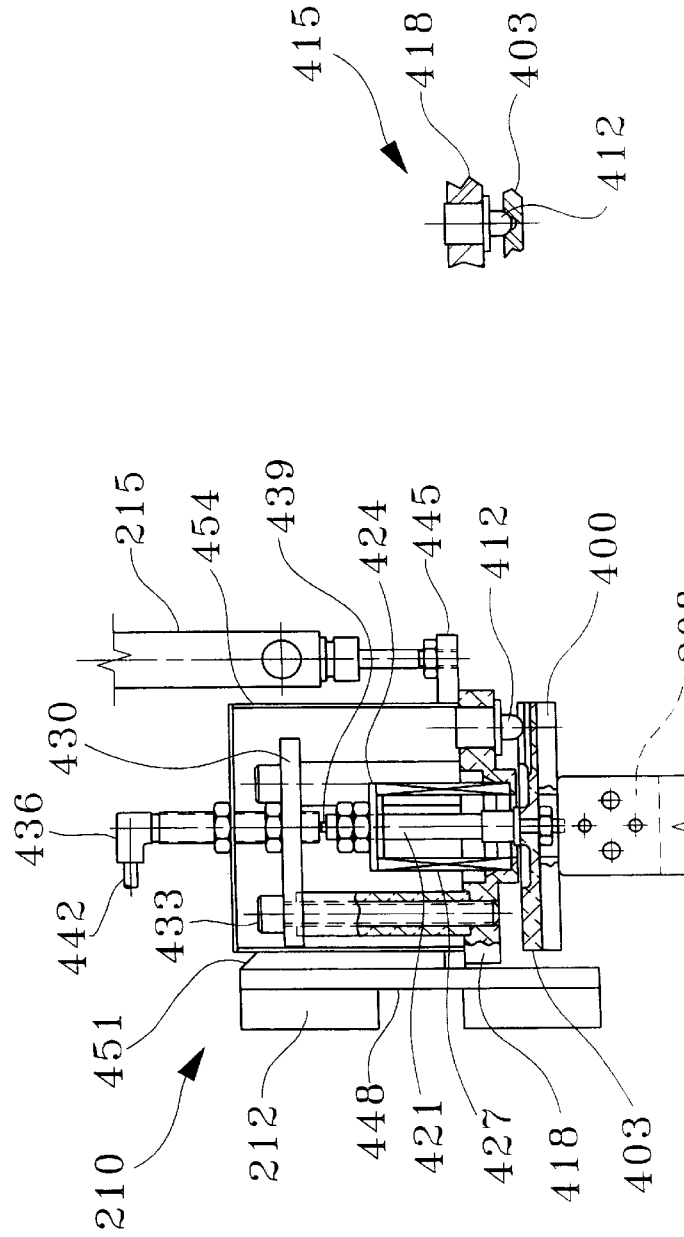
FIG. 39 is a sectional elevation of the swing frame compliance device shown in FIG. 25

The swing frame 190 includes a pair of spaced longitudinal members 192 and 194 connected at their ends by a pair of end members 196 and 198 to produce a rectangular frame 199. The longitudinal members 192 and 194 each have a depending finger 200 with an aperture 202 at its lower end by which the swing frame 190 is attached to a pair of arms 204 by a pivot pin 206. The arms 204 are attached at their upper ends to the ends of a cross bar 208 that in turn is attached to the underside of a compliance device 210, shown in FIG. 25, mounted by linear bearings 212 to the right hand face of the structural post 112. The compliance device 210 is described in detail below in conjunction with FIGS. 39–41. A pneumatic cylinder 215 is connected between the underside 114 of the main plate 110 and the compliance device 210 for vertical position control of the swing frame 190 and also to provide a downward biasing force on the swing frame 190 to establish hard contact between the stringer 42 and the fixture during operations on the stringer.

Two contact posts 220 on the swing frame 190 are formed integrally and depend from the center of the two end members 196 and 198. The distal end of the contact posts are rounded to avoid marring the paint on the stringers 42 and are at the longitudinal ends of the swing frame to have the greatest stability in holding the stringer 42 to the fixture, and also in self aligning the swing frame 190 about the pivot pin 206 to the angle of the stringer at the point of clip insertion when the contact posts 220 engage the floor of the stringer channel. Alignment of the swing frame 190 assures proper alignment of spreader bars and clamp bars on the stringer 42 during operations on the stringer, as described below.

A pair of spreader assemblies 230, shown in FIGS. 25–28, are supported on the outside surfaces 232 and 234 of the end frame members 196 and 198 for spreading the sidewalls of the stringer 42 apart to facilitate insertion of the stringer clips 46 into the stringer channel. The spreader assemblies include two slide bars 238 and 239 mounted on linear bearings 236 for linear motion along the end members 196 and 198. A double acting air cylinder 240 is connected between a pair of lugs 242 and 244 on the slide bars 238 and 239 for translating the expansion and contraction action of the air cylinder 240 to the slide bars 238 and 239. Two spreader bars 246 and 248, shown most clearly in FIG. 29, project downwardly from the adjacent edges of the two slide bars 238 and 239 to a position where they can engage the inside surfaces of a stringer sidewall 56 for spreading the stringer channel 54 for insertion of a stringer clip 46. Two air line couplings 247 on each pneumatic cylinder 240 provide for connection of air supply lines through an in-line flow restrictor 249 (shown only on the cylinders 240 on the right hand side of FIG. 27) to control the speed of actuation of the spreaders and clamps. The flow restrictors in the cylinders on the left hand side of the swing frame are integral with the fittings.

A centering pin 250 pressed into a hole in the contact posts 220 projects outward between the spreader bars 246 and 248, as shown in FIGS. 28 and 29, to ensure that the spreader bars 246 and 248 are centered on the end members 196 and 198 when the cylinder is in its fully contracted state, as shown in FIG. 29. A bolt 253 extends through aligned holes in lugs 255 in the spreader bars 246 and 248 to limit their separation to the extent desired for the spreading of the stringer side walls when inserting the stringer clip 46.

Two clamp assemblies 260 are attached to the swing frame 190 at about ¼ positions lengthwise of the frame from its ends. The clamp assemblies 260 each include a pair of ball splines 262, Model 2LT 85UU+200L made by THK Company, Ltd. in Tokyo, Japan. The ball splines have a longitudinally grooved shaft 264 and a pair of sleeves 266 movable longitudinally along the shaft supported on ball bearings in the grooves, guiding the sleeves 266 for smooth longitudinal motion but preventing rotation about the axis the shaft 264. Two ball splines 262 are used for each clamp assembly 260, attached at one end of the shafts 264 to the inside edge of the longitudinal members 192 and 194 and connected together at the abutting ends in the longitudinal centerline of the frame by a coupling 268. Two pneumatic cylinders 241 are attached to the ball splines 262 by two connectors 270, each of which has an axial bore that receives the sleeves 266 with a snug fit. Set screws 272 fix the sleeves 266 in position in the bore of the connector. Each connector 270 has a projecting lug 274 by which the cylinders 241 are connected at one end to one connector 270, and the distal end of the piston rods 273 are connected to the other connector 270. A depending clamp bar 275 integral with the connector 270 engages the outside edges of the stringer 42 when the clamp is operated to squeeze the sidewalls 56 of the stringer 42 on the clip 46 during drilling. A cylindrical spacer 276 on each end of the ball spline shafts 264 between the longitudinal members 192 and the connectors 270 spaces the outside end of the connectors 270 inward a desired distance so that the clamp bars 275 are equally spaced from the longitudinal members 192 of the frame 199 when the clamp is opened by extension of the air cylinder 241.

In this embodiment, the axes of the two drill heads are aligned on a single axis parallel to the X-axis. Since the X-axis is perpendicular to both the Y-axis and the Z-axis, movement of either or both the Z-axis carriage and/or the Y-axis carriage moves the drilling axis in a self-parallel fashion so that it remains parallel to the X-axis and perpendicular to the Z-axis.

Movement of the Z-axis carriage 140 on its guide rails on the underside 114 of the main plate 110 is effected by a servomotor 280 attached by a mount 282 to the upper surface 118 of the main plate 110. The servomotor shaft is coupled to a ball screw 284 via a coupling 286 to protect the servomotor bearings. The ball screw 284 is mounted in a front bearing block 288 and extends therefrom, in line with the servomotor axis, to a ball nut 290 fixed in a compliance device 292 on top of the main plate 110.

The compliance device 292, shown in FIGS. 13, 14, and 31–35, includes a roughly octagonal cross-section housing 294, shown in FIGS. 33–35, having an axial bore 296. Three lugs 298 at the top and two horizontal side positions are drilled and tapped for fastener holes 299. A connector block 300 depends from the lower side of the housing 294, opposite the top lug 298, and has two vertical tapped holes 301 by which the Z-axis carriage 140 is attached to the housing 294 from the underside of the main plate 110. A horizontally elongated opening 302 in one side of the housing provides a passage for a transfer pin 304 connecting a ball nut carrier 306 to a proximity sensor target 308 on the outside of the housing 294 so the ball nut carrier 306 and the proximity sensor target 308 move together when the compliance device 292 is actuated.

The ball nut 290 is pressed into an axial opening in the ball nut carrier 306 and transfers longitudinal translating forces exerted via the ball screw 284. A sleeve 310 surrounds the ball nut carrier 306 and has exactly the same axial length as the ball nut carrier, but is sized to slide axially therein when the compliance device 292 is actuated. A sleeve locating pin 312 extends through a hole 314 in the opposite side of the housing 294 from the elongated hole 302 and into the sleeve 310 to hold the sleeve immobile in the housing 294 when the compliance device 292 is actuated, as described below.

Two spring sliders 320 are disposed on opposite axial ends of the ball nut carrier 306 and the sleeve 310 and are biased thereagainst by a pair of compression springs 322, captured by end plates 324 and 326 on the outside ends of the springs 322. The sleeve 310, held against sliding motion in the housing 294, isolates the action of the two springs 322 from each other so that the full force of either spring must be overcome to actuate the compliance device 292. The end plate 324 on the proximal end of the ball screw 284, on the servomotor side, is retained in the housing by an integral flange 328 on that end of the housing 294, and the end plate 326 on side of the distal end of the ball screw 284, on the opposite side from the servomotor, is retained by a retaining ring 330 fastened to the lugs 298 on the housing 294. A ball screw shield 332 is fastened to the end plate 326 over the distal end of the ball screw 284 to protect it from drill chips and other debris, and to protect workers from injury by getting their clothing or hair entangled in the ball screw.

A proximity sensor 334 is mounted on a mounting block 335 fastened to the side of the housing 294 over the elongated opening 302 by several screws threaded into tapped holes 336 in the side of the housing 294. A through slot 337 in the mounting block 335 receives the proximity target 308 with a snug sliding fit which allows the proximity target 308 to move with the ball nut carrier 306 relative to the housing 294 and the proximity sensor 334 when the compliance device 292 is actuated. Movement of the proximity target 308 from the normal to the position shown in FIG. 31 to the actuated position shown in FIG. 32 shifts a hole 338 in the proximity target 308 from its normal position aligned with the proximity sensor 334 to a misaligned position in the actuated condition which triggers the proximity sensor 334 and sends a signal to a dynamic brake system, described in detail below, to stop the servomotor 280.

Figure 18:
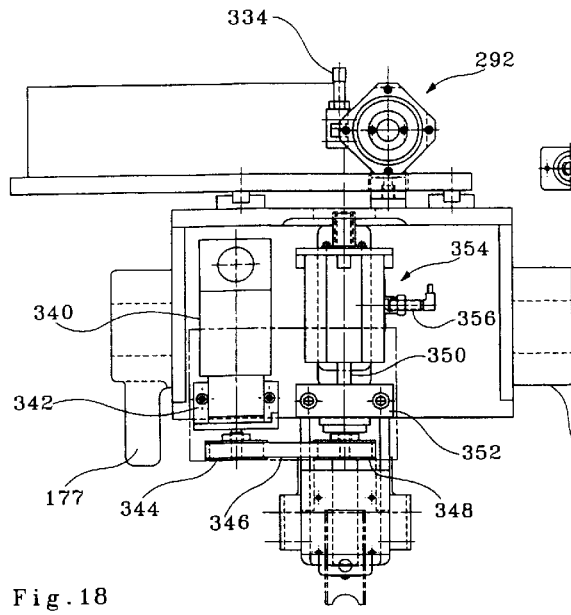
FIG. 18 is a left side elevation along lines 18—18 in FIG. 17.
Figure 19:
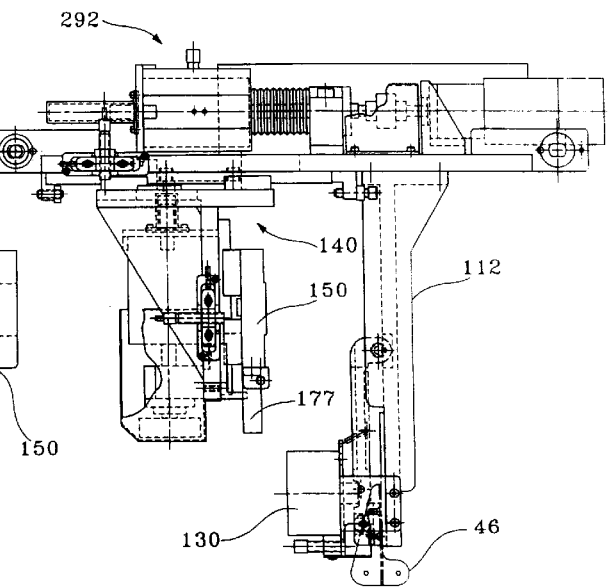
FIG. 19 is front elevation of the partially built end effector shown in FIG. 13A, but omitting the drill carriages for clarity of illustration.

Motion of the Y-axis carriage 150 is effected by a Y-axis servomotor 340 mounted on the Z-axis carriage by a mounting bracket 342, as shown in FIGS. 18–20. A cog wheel 344 is attached to the motor shaft of the servomotor 340 and drives a cog belt 346 which in turn drives a cog wheel 348 attached to a an end of a ball screw 350 supported in a bearing block 352 and threadedly engaged with a ball nut in a Y-axis compliance device 354. The Y-axis compliance device is substantially similar to the Z-axis compliance device 292 except for the way the proximity sensor 356 is attached. As shown in FIGS. 18, 21, 31 and 32, the proximity sensor 356 for the Y-axis compliance device 354 extends horizontally, perpendicular to and intersecting the longitudinal axis of the compliance device 354. In the Z-axis compliance device 292, the proximity sensor 334 is oriented vertically on one side on the mounting block 308, perpendicular to the axis of the compliance device 292 but offset to one side thereof. The proximity sensor is aligned over a vertical hole which moves with the proximity target 308 when the compliance device 292 is actuated, functioning in exactly the same way as the compliance device 354.

When either of the proximity sensors 334 on the compliance devices 292 or 354 is triggered by movement of the proximity target 308 relative to the housing 294, it sends a signal to a dynamic brake interface 360 to brake the motor 280 or 340. The motors 280 and 340 each have Hall effect sensors 361, 362 and 363 which sense motor shaft position by small magnets located around the motor shaft. When a Hall effect sensor turns on, it sends a signal to an amplifier 364 which turns on power through power leads 368, 369 and 370 to the corresponding winding in the motor to provide driving torque to rotate the motor shaft.

When the brake interface 360 receives a signal from either compliance device 292 or 354, it triggers a logic device to interrupt the circuit from the Hall effect sensors 361, 362, and 363 to the amplifier 364. When the circuit to the amplifier 364 is interrupted, a DC voltage is momentarily (less than a second) applied to all three Hall effect sensor leads by a "one shot" circuit which causes the amplifier 364 to apply full power voltage to all three motor windings 365, 366 and 367 simultaneously. The effect of energizing all three motor windings simultaneously is to bring the motor shaft to a halt virtually instantaneous, usually within ⅓ revolution. To avoid overheating the motor, the power to the motor windings is then shut off by grounding the Hall effect leads, causing the amplifier 364 to deenergize the power to the motor winging leads.

The compliance device 210 includes a base plate 400 welded to the cross bar 208, and a hardened steel V-groove plate 403 attached to the base plate 400. The V-groove plate 403, shown in FIG. 40, has four holes which receive screws 406 by which the V-groove plate is fastened to the base plate 400, and has three radial grooves 409, each having flat converging sides and a cylindrical relief in the floor of the groove 409. The grooves 409 each receive the rounded end 412 of a ball-nose pin 415 that is mounted in an upper plate 418. A bolt 421 extends at one end through the center of the V-groove plate 403 and at the other end through a spring plate 424. A strong compression spring 427 is compressed between the spring plate 424 and the upper plate 418 to hold the V-groove plate 403 and the attached base plate 400 and cross bar 208, and the attached swing frame 190, up against the ball nose pins 415 in the upper plate 418.

A stand-off plate 430 is supported on the upper plate 418 by three long cap screws which each extends through a bore or a stand-off sleeve and is threaded into the upper plate. The stand-off plate 430 supports the end of a proximity sensor 436 trained on a reduced diameter nub 439 on the protruding upper end of the bolt 412. Movement of the nub 439 laterally or axially will be detected by the proximity sensor 436 which then sends an electrical signal via a conductor 442 to the controller that the compliance device has been triggered.

The compliance device 210 is mounted in a hole through a floor plate 445 of a support bracket having and an upright plate 448 braced by two side gusset plates 451. The pneumatic cylinder 215 is attached to the floor plate and the linear bearings 212 by which the compliance device is guided on the structural post 112, are attached to the upright plate 448. A sheet metal cover 454 encloses the end of the proximity sensor 436 and the compression spring 427.

Actuation of the compliance device 210 occurs when the swing frame 190 is bumped hard enough to tilt or rotate the V-groove plate 403 out of its neutral position held by engagement of the ball nose pins 412 in the grooves 409. A rotation of the V-groove plate 403 causes the plate 403 to retract axially away from the upper plate 418 against the biasing force of the compression spring 427. Axial movement of the plate 403 causes corresponding displacement of the nub 439 on the end of the bolt 412 and is detected by the proximity sensor 436. Likewise, tilting motion of the V-groove plate 403 caused by lateral impacts against the swing frame will cause a lateral translation of the nub 439 which will be detected by the proximity sensor 436.

In operation, the assembly cell 70 is initiated by running an initiation program in the controller 90 to home the machine tool 76 and then direct it to probe a fixed monument to ensure that the machine tool 76 is operating properly and that its feedback signals are properly coordinated with the machine tool controller 90.

After initiation is successfully completed, the machine tool 76 releases the probe, picks up the end effector 74, and moves the end effector to a fixed probe mounted on the fixture 72 where it touches the hardened steel face plate 136 to validate the critical station plane datum, and also touches three ground surfaces on the drills, all to validate and update the position of the end effector on the arm of the machine tool 76. If the part program for the stringers in the curved contour section of the fuselage has not already been loaded, it is loaded at this time. The appropriate headers 77 in the assembly cell are positioned to establish contact points that define the curvature of the fuselage, and the stringers are positioned on the headers 77 by the clamps 79 and held immobile in their predetermined positions.

Figure 42:
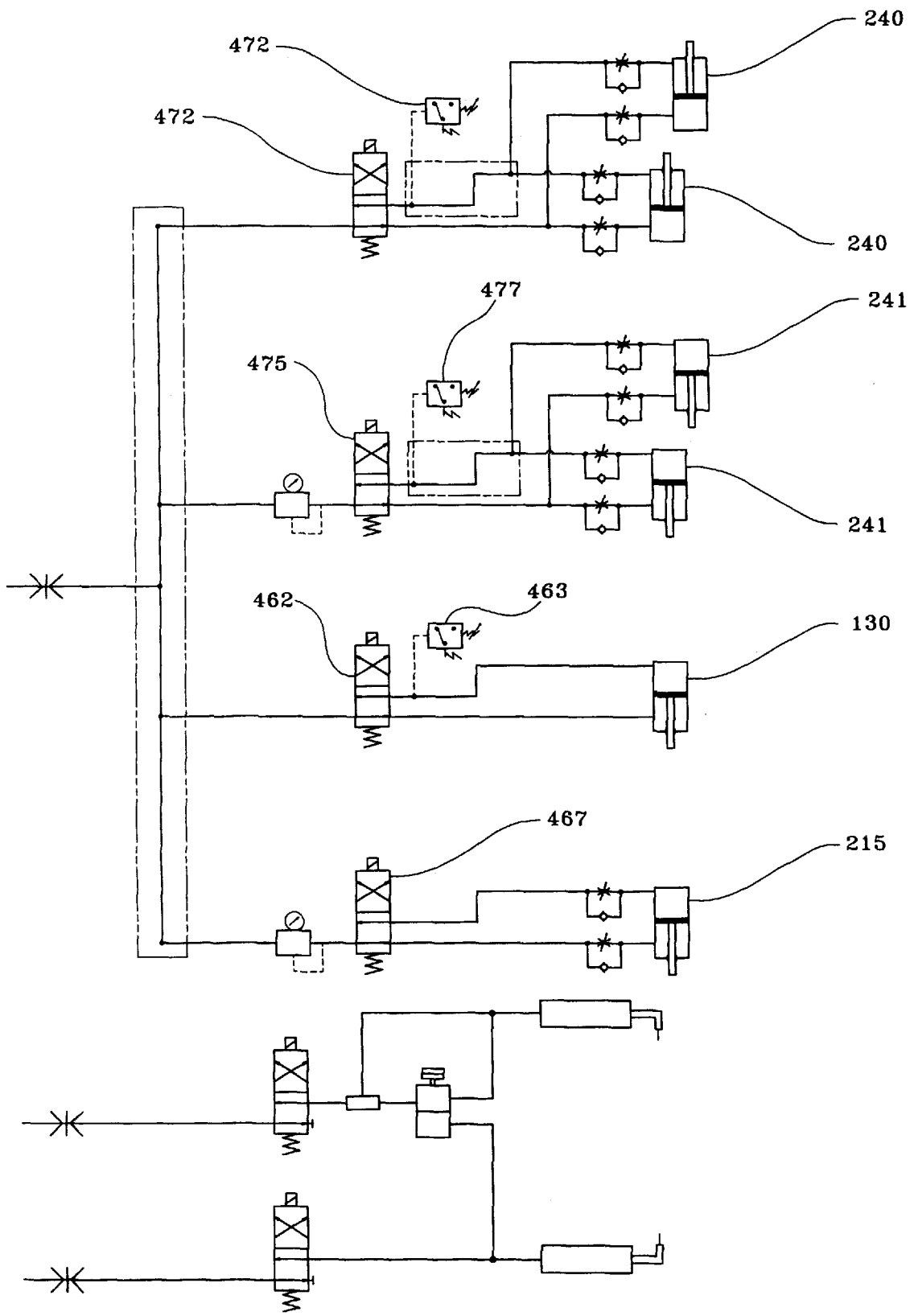
FIG. 42 is a pnuematic control diagram for the end effector shown in FIG. 4.

Clips 46 are loaded in a parts presenter, which accurately feeds clips to a known position for pickup by the clamp. The machine tool 76 drives its arm 73 to position the end effector 74 over the clip 46 and the clamp 126 is opened by the clamp arm spring and its opening is confirmed by a proximity sensor 460 mounted on the post 112 over a hole through the post and the hardened steel plate 132. The clamp 126 is closed on the clip 46 by energizing a solenoid valve 462, shown in FIG. 42, which admits air under pressure into the air cylinder 130, which event is confirmed by a pressure operated switch 463. The parts presenter releases the clip and the end effector 74 lifts the clip out of the parts presenter and is moved to the position designated by the part program in the controller 90 for that particular clip. The end effector 74 is moved toward the stringer held in the fixture 72 and a solenoid valve 467 is energized to pressurize the air cylinder 215 and extend the swing frame toward the stringer 42. A hall effect sensor detects the motion of the swing frame to the extended position. The contact posts 220 of the swing frame 190 first contact the floor 52 of the stringer channel 54 and the swing frame 190 pivots about the pivot pin 206 to align the angle of the swing frame 190 with the angle of the stringer, and the air cylinder 215 is compressed, moving the swing frame to an intermediate position which is detected by another Hall effect sensor.

A solenoid valve 470 is energized to pressurize the spreader cylinders 240 to drive the spreader bars 246 and 248 apart to the limit permitted by the stop bolt 253, and pressurization is confirmed by a pressure operated switch 472. With the stringer sidewalls 56 spread apart, the end effector now inserts the clip 46 into the stringer channel 54, further compressing the cylinder 215. The extent of insertion of the clip 46 into the stringer channel 54 is determined by the position of the end effector and is independent of the operation of the swing frame 190. The position and orientation of the clip 46 in the stringer channel 54 is very accurately determined by the positioning accuracy of the machine tool 76.

With the clip 46 accurately held in position in the stringer channel 54, the solenoid valve 470 for the spreader cylinders 240 is turned off, venting the cylinders 240, which event is confirmed by the pressure operated switch 472, and a solenoid valve 475 is energized to pressurize the air cylinders 241 for the stringer clamps 260, which event is confirmed by a pressure operated switch 477.

The drills are now positioned to drill a first pair of aligned holes through the stringer 42 and the clip 46 by moving the Z-axis carriage and the Y-axis carriage to the position determined for that stringer clip by the digital model 100. Since the position of the end effector 74 is used to determine the critical angle of the clip web 45, to ensure that it is aligned with the station plane at that location, the axis of the drills is made adjustable on the end effector 74, since the hole axis position is less critical than the angle of the clip web 45. After drilling the first pair of holes, the drills are retracted and the drill axes are repositioned to drill the second pair of holes, followed by retracting the drills again. The clip is now released by depressurizing the air cylinder 130 and the end effector is again directed back to the parts presenter to pick up the next clip.

The preferred embodiment illustrates stringer clips 46 for "hat section" stringers 42, but it is contemplated that the invention could also be used for placement of stringer clips on other common forms of stringers, such as "Z" stringers. For "z" stringers, there would be no need for the spreaders, and the clamps would be modified to clamp the clips to the stringer instead of clamping the sidewalls of the stringer on the clip, but the basic process and operation would otherwise be the same. This and numerous other modifications and variations of the preferred embodiment described above will become apparent to those skilled in the art in view of this disclosure. Also, many functions and advantages are described for the preferred embodiment, but in some uses of the invention, not all of these functions and advantages would be needed. Therefore, we contemplate the use of the invention using fewer than the complete set of noted functions and advantages. Moreover, several versions of subcombinations of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly to be understood that all the disclosed species and embodiments, and the numerous modifications and variations, and all the modifications and variations, and the equivalents thereof, shall be considered to be within the spirit and scope of the invention as defined in the following claims, wherein

We claim:

1. An apparatus for placing a stringer clip at a predetermined location longitudinally along a stringer and at a predetermined orientation relative thereto, and for drilling holes laterally through sidewalls of said stringer and through said clip, comprising:

a frame including a main plate and an attached structural post, said main plate having a coupling surface to which is attached a coupling device by which said frame is coupled to an arm of a positioning device, and an operating surface to which is attached operating structures for performing operations on said clip and said stringer;

said structural post fastened rigidly to said operating surface of said main plate and projecting outward therefrom;

a gripper arm mounted on said post for gripping and holding a stringer clip against a reference surface on said post;

a clamp operatively mounted on said frame and having clamping faces for clamping said clip in said predetermined position to said stringer;

a drill assembly operatively mounted on said frame and having drill heads for holding bits for drilling holes from opposite sides of said stringer;

adjustment apparatus for moving said drill heads relative to said post to adjust the line of action of said drill assembly;

whereby said drill heads are adjusted, depending on the position of said stringer clip lengthwise of said stringer, to drill said holes at said desired positions in said stringer.

2. An apparatus as defined in claim 1, wherein said adjustment apparatus includes:

a Z-axis carriage mounted on linear bearings on said operating surface of said main plate for movement relative thereto in a Z-axis about parallel to said stringer axis and a skin contact plane on said stringer; and a Y-axis carriage mounted on linear bearings on said Z-axis carriage for movement relative thereto in a Y-axis about perpendicular to said Z-axis and an X-axis transverse to said stringer axis and parallel to said stringer contact plane;

drill mounts for mounting two of said drills on said Y-axis carriage for movement relative thereto parallel to said X-axis toward and away from each other;

whereby said drill heads are adjusted in said Z-axis and said Y-axis by moving said drill heads parallel to said X-axis to drill holes from opposite sides of said stringer through said stringer sidewalls and said stringer clip.

3. An apparatus as defined in claim 2, further comprising:

a drive mechanism for moving said drill units toward and away from each other to plunge said drill bits into said stringer sidewalls and said stringer clip.

4. An apparatus as defined in claim 3, further comprising:

a swing arm mounted on said main plate by air cylinders, and guided on said structural post for movement longitudinally of said post toward and away from said stringer under control of said air cylinders.

5. An apparatus as defined in claim 3, further comprising:

a servomotor mounted on said X-axis carriage for controlled movement of said Y-axis carriage on said X-axis carriage;

a drive transmission mechanism coupled between said servomotor and said Y-axis carriage for translating rotation of a drive spindle of said servomotor into linear motion of said Y-axis carriage on said X-axis carriage.

6. An apparatus as defined in claim 5, further comprising:

a compliance device mounted between said servomotor and said X-axis carriage for detecting an overtravel condition or an impact exceeding a predetermined magnitude, and for producing a signal indicative thereof.

7. An apparatus as defined in claim 3, wherein:

said drive transmission mechanism includes a first cog wheel connected to said servomotor drive spindle and a ball screw lying parallel to said servomotor drive spindle, said ball screw having a second cog wheel connected thereto, and a cog belt around and engaged with both of said cog wheels for transmitting torque from said servomotor drive spindle to said ball screw for controlled rotation of said ball screw.

8. An apparatus for placing a stringer clip at a predetermined location longitudinally along a stringer and at a predetermined orientation relative thereto, and for drilling holes laterally through sidewalls of said stringer and through said clip, comprising:

a frame to which is attached a coupling device by which said frame is coupled to an arm of a positioning device, and an operating surface to which is attached operating structures for performing operations on said clip and said stringer;

a gripper arm mounted on said frame for gripping and holding a stringer clip;

said operating structures including a clamp and a drill assembly;

said clamp operatively mounted on said frame and having clamping faces for clamping said clip in said predetermined location and orientation on said stringer;

said drill assembly operatively mounted on said frame and having drill heads for holding bits for drilling holes along a line of action from opposite sides of said stringer;

adjustment apparatus for moving said drill heads relative to said frame to adjust said line of action of said drill assembly;

whereby said drill heads are adjusted on said frame, depending on the position of said stringer clip lengthwise of said stringer, to drill said holes at said desired positions in said stringer.

9. An apparatus as defined in claim 8, further comprising:

a servomotor mounted on said frame for controlled movement of at least one of said operating structures;

a drive transmission mechanism coupled between said servomotor and said operating structures for translating rotation of a drive spindle of said servomotor into linear motion of said operating structure on said frame.

10. An apparatus as defined in claim 9, wherein:

said drive transmission mechanism includes a compliance device for detecting an overtravel condition or an impact exceeding a predetermined magnitude, and for producing a signal indicative thereof.

* * * * *